United States Patent
Weinhofer et al.

(10) Patent No.: US 7,099,719 B2
(45) Date of Patent: Aug. 29, 2006

(54) OUTPUT CAM SYSTEM AND METHOD

(75) Inventors: Juergen K. Weinhofer, Chagrin Falls, OH (US); Jacob S. Baker, Rocky River, OH (US); Kendal R. Harris, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 414 days.

(21) Appl. No.: 10/175,518

(22) Filed: Jun. 19, 2002

(65) Prior Publication Data
US 2003/0233906 A1   Dec. 25, 2003

(51) Int. Cl.
G05B 11/01 (2006.01)

(52) U.S. Cl. .................. 700/17; 700/79; 700/65; 700/66; 29/38; 82/118

(58) Field of Classification Search .............. 700/17, 700/79, 80, 65, 66; 318/600; 29/38 B, 38; 72/43; 82/118
See application file for complete search history.

(56) References Cited

U.S. PATENT DOCUMENTS

| | | | |
|---|---|---|---|
| 5,453,933 A | | 9/1995 | Wright et al. |
| 5,509,966 A | | 4/1996 | Sykes |
| 5,531,085 A | * | 7/1996 | Hayes ........................... 72/43 |
| 6,084,372 A | * | 7/2000 | Saylor ..................... 318/568.1 |
| 6,107,769 A | * | 8/2000 | Saylor et al. ................ 318/600 |
| 6,219,895 B1 | * | 4/2001 | Muscarella et al. ......... 29/38 B |
| 6,263,553 B1 | * | 7/2001 | Muscarella et al. ......... 29/38 B |
| 6,317,646 B1 | | 11/2001 | de Caussin et al. |
| 6,421,895 B1 | * | 7/2002 | Muscarella et al. ......... 29/38 B |

(Continued)

OTHER PUBLICATIONS

"FM 452 Electronic Cam Controller Installation and Parameter Assignment"; EWA 4NEB 720 6012-02 a; (Edition 2); (202-pg. product manual); Siemens; SIMATIC; Order No. 4NES 720 013-01; ( © Siemens AG 1996).

(Continued)

*Primary Examiner*—Anthony Knight
*Assistant Examiner*—Sunray Chang
(74) *Attorney, Agent, or Firm*—Foley & Lardner LLP; R. Scott Speroff

(57) ABSTRACT

In accordance with a first preferred embodiment, a control method comprises monitoring a position of a motion control axis and controlling an output device responsive to the position of the motion control axis. The controlling step further includes latching a cam element that controls the output device, and unlatching the cam element that controls the output device. The, manner in which the latching step is performed and the manner in which the unlatching step is performed are configurable in a programming interface. The programming interface is capable of receiving a latch position for the cam element and an unlatch position for the cam element. The programming interface is further capable of receiving additional configuration information to configure the manner in which the latching step is performed and different additional configuration information to separately configure the manner in which the unlatching step is performed. The latching step and the unlatching step are performed in the manner configured in the programming interface. In accordance with another preferred embodiment, a programming interface for a control system comprises an axis motion control instruction and an output cam instruction. The axis motion control instruction is executable to control movement of a motion control axis. The output cam instruction is executable to control a state of an output device responsive to a position of the motion control axis. The programming interface permits the axis motion control instruction and the output cam instruction to both be used in a common user program.

22 Claims, 17 Drawing Sheets

U.S. PATENT DOCUMENTS

| | | |
|---|---|---|
| 6,778,867 B1 * | 8/2004 | Ziegler et al. ............... 700/79 |
| 6,799,195 B1 | 9/2004 | Thibault et al. |
| 2002/0110155 A1 | 8/2002 | Pearce et al. |
| 2004/0024472 A1 | 2/2004 | Evan et al. |

OTHER PUBLICATIONS

"PS-6000 Series Programmable Limit Switches / Available with Modbus™ ASCII Communications"; (12-pg. product manual); Electro Cam Corp.; PLµS Controls Div.; Roscoe, IL; (Apr. 1998).

"CamCon 1756-DICAM / Digital Cam Switch Unit"; Edition: Nov. 9, 2002; (50-pg. product manual); for AB ControlLogix® ; Digitronic Automationsanlagen GmbH; Hünstetten—Walbach, GERMANY; © 1992-2002.

"PLµS® PS-6344 Series / Programmable Limit Switch Dual Resolver Model"; (111-pg. Programming and Installation Manual); Electro Cam Corp.; Roscoe, IL; (May 2000).

"ControlLogix Programmable Limit Switch Module"; 1756-PLS; (113-pg. User Manual); Allen-Bradley; Rockwell Automation; Publication 1756-UM002A-US-P—Feb. 2000; © 1999 Rockwell International Corporation.

"Logix Controller Motion Instruction Set"; (Cat No. 1756-L1, -L1Mx); (163-pg. Reference Manual); Allen-Bradley; Rockwell Automation; Publication 1756-RM007C-EN-P—Jul. 2001; © 2001 Rockwell International Corporation.

"The Series 2500 / A New Family of Programmable Switches"; AMETEK® ; Gemco; (12-pg. product manual); Clawson, MI; (Jul. 2001).

"Resolver Input Micro-Set PLS"; Series 1995A; Gemco™ ; AMETEK® Patriot Sensors; (4-pg. product manual); Claswon, MI; (Jun. 1999).

"Programmable Limit Switch (PLS) and Die/Automation Monitor (DM) Sofware for SLC Processors / for PLS/DM software (Cat. No. 6556-SPAKS) or kit (Cat. No. 6556-SPAKK)"; (16-pg. product manual); Rockwell Automation; Allen-Bradley; Publication 6556-2.12—Jun. 1996; Milwaukee, WI; © 1996 Allen-Bradley Company, Inc.

"Programmable Limit Switches (PLS)—Section D"; (50-pg. product manual); Autotech Controls; [Date Unknown].

"Electronic cam control ROTARNOCK 1 / 2 /3 /4 Multiturn-ROTARNOCK Display and operation unit TERM 4 / TERM 5 / TERM 6"; Version 10.9, Art.-No. V3044E; (68-pg. Instruction manual); Deutschmann Automation GmbH; Bad Camberg; (May 29, 2002).

* cited by examiner

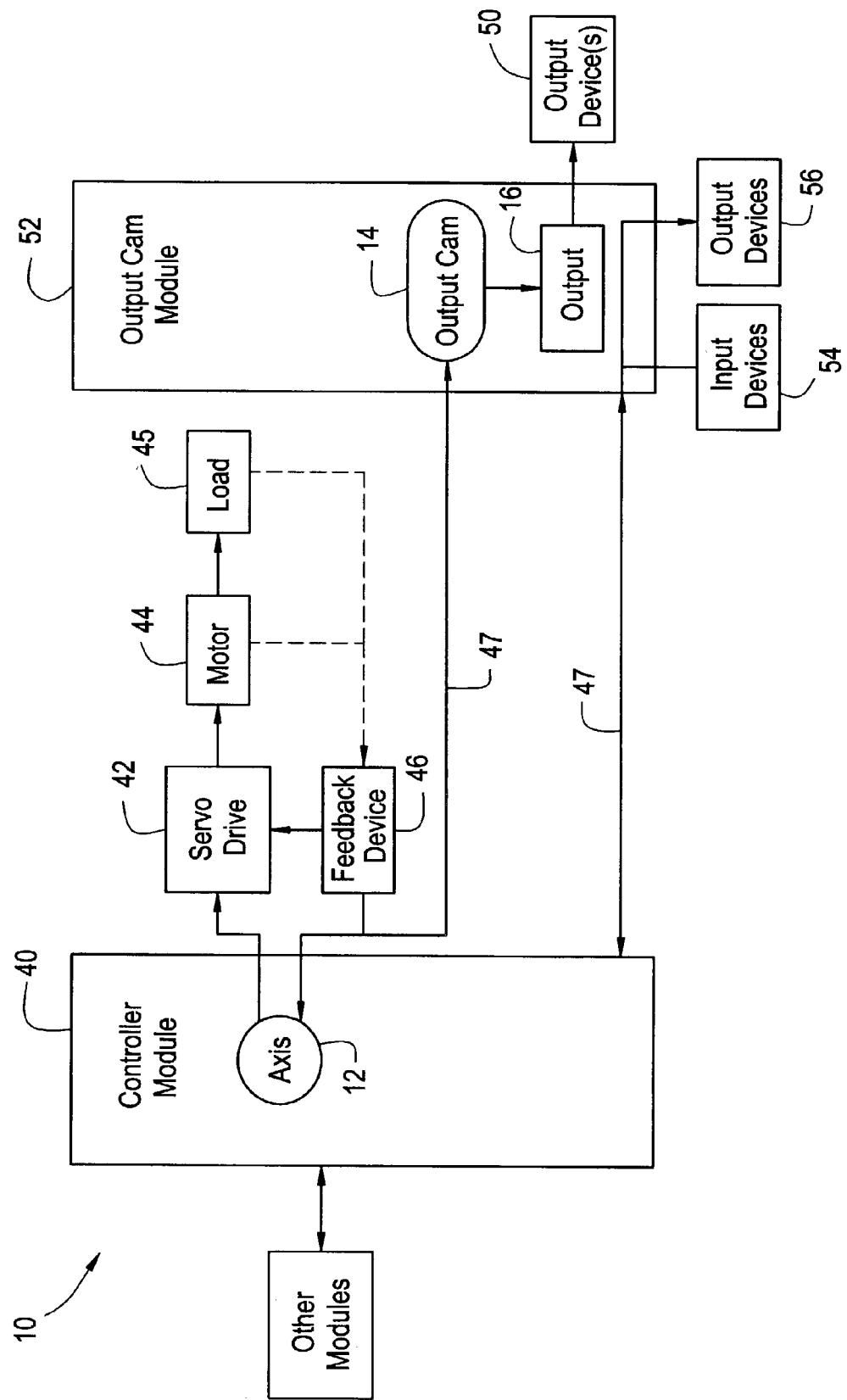

OUTPUT CAM SYSTEM AND METHOD

BACKGROUND OF THE INVENTION

1. Field of the Invention

The present invention relates to output cam systems and methods that control output devices.

2. Description of Related Art

Cam systems are used in a wide variety of different systems to control output devices. For example, in industrial control systems, cam systems are commonly used to control the operation of one or more output devices responsive to the operation of one or more other devices. For example, in one configuration cam systems are used to control output devices responsive to the operation of a motor. In such a configuration, the cam system may be used to synchronize the operation of the output devices to the operation of the motor, such that the output devices assume different output states in accordance with the real time position of the motor shaft. Therefore, for example, as a product moves on a conveyor belt, a cam system may be used to control the output devices responsive to motor position so as to cause certain actions to be taken at predetermined locations along the conveyor belt. Rather than use motor position as the motion control axis, another motion control axis may also be used, such as an axis more directly associated with the device driven by the motor. Other configurations are also possible.

Early cam systems were mechanically implemented, such as a camshaft used in an internal combustion engine system. With the development of digital signal processing technology, including microprocessor technology, cam systems are now widely electronically implemented. Electronic implementation of cam systems is advantageous because it allows more complex relationships between a larger number of devices to be defined. However, as the complexity of cam systems increases, there is an increased need for improved cam systems and related programming tools that are easy to use, flexible, and/or capable of allowing increasingly complex relationships to be defined and monitored. Output cam systems and methods that preferably meet one or more of these needs would be highly advantageous.

SUMMARY OF THE INVENTION

In accordance with a first preferred embodiment, a control method comprises monitoring a position of a motion control axis and controlling an output device responsive to the position of the motion control axis. The controlling step further includes latching a cam element that controls the output device, and unlatching the cam element that controls the output device. The manner in which the latching step is performed and the manner in which the unlatching step is performed are configurable in a programming interface. The programming interface is capable of receiving a latch position for the cam element and an unlatch position for the cam element. The programming interface is further capable of receiving additional configuration information to configure the manner in which the latching step is performed and different additional configuration information to separately configure the manner in which the unlatching step is performed. The latching step and the unlatching step are performed in the manner configured in the programming interface.

In accordance with another preferred embodiment, a programming interface for a control system comprises an axis motion control instruction and an output cam instruction. The axis motion control instruction is executable to control movement of a motion control axis. The output cam instruction is executable to control a state of an output device responsive to a position of the motion control axis. The programming interface permits the axis motion control instruction and the output cam instruction to both be used in a common user program.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 4 is an embodiment of a motion control system in which output cam control logic is provided in an output cam module;

DETAILED DESCRIPTION OF THE PREFERRED EMBODIMENTS

Various preferred embodiments of the invention will now be described. Although the invention is described by way of example in the context of an industrial control system, it will be appreciated that the invention may be employed in other types of systems as well.

A. System Architecture

Figure 1:
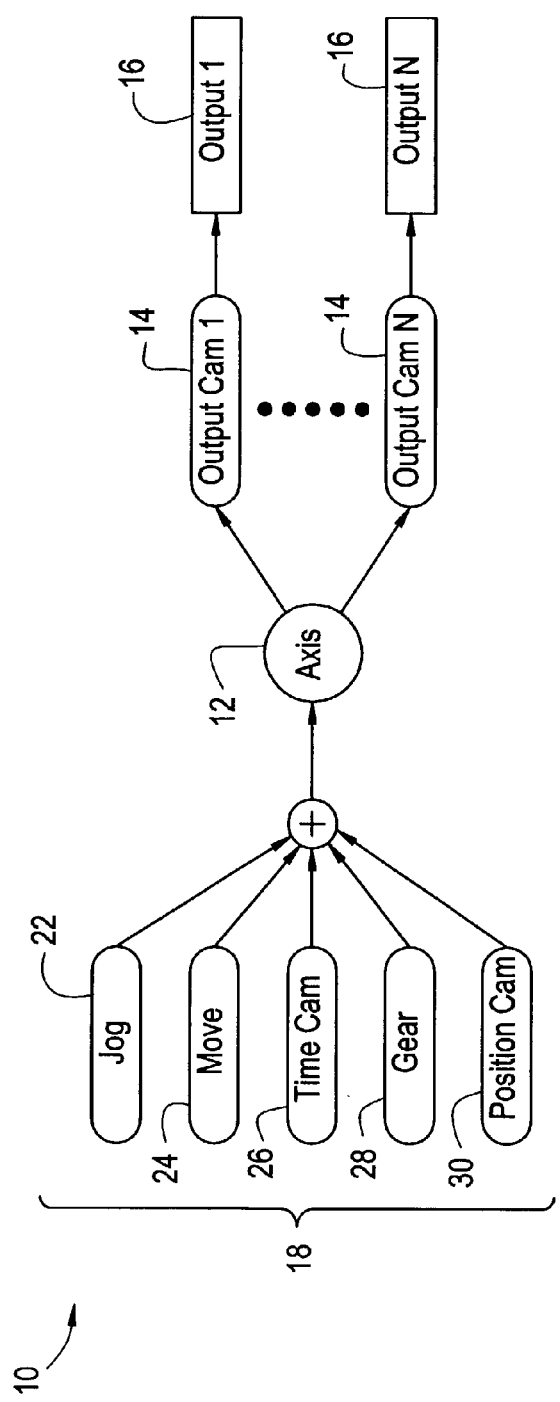
FIG. 1 is a functional block diagram showing building blocks usable to program a motion control system.

Referring now to the Figures, FIG. 1 is a functional block diagram showing building blocks embodied in a programming interface usable to program a motion control system 10. The building blocks include a motion control axis block 12, one or more output cam blocks 14, one or more output blocks 16, and a plurality of motion control blocks 18. The motion control blocks 18 further include a jog block 22, a move block 24, a time cam block 26, a gear block 28, and a position cam block 30. The building blocks 12–18 may be used for programming a wide variety of practical motion control systems. Therefore, although only one of each of the building blocks 12–18 is shown, it will be appreciated that this configuration is purely for purposes of explanation and that practical systems are likely to have a configuration different than that shown in FIG. 1, typically with many additional ones of the building blocks 12–18. Fewer, more, or different building blocks may also be used.

In one embodiment, the building blocks 12–18 are implemented using objects in an object-oriented programming language. Thus, the axis block 12 may be implemented using an object having services that may be invoked using one or more axis instructions, and the output cam block(s) 14 may be implemented using an object having services that may be invoked using one or more output cam instructions. Further, each of the motion blocks 18 may be implemented using objects (e.g., a jog object, a move object, a time cam object, a gear object, and a position cam object) having services that may be invoked using one or more respective instructions (e.g., a jog instruction, a move instruction, a time cam instruction, a gear instruction, and a position cam instruction). In designing such a system, a new instance of the axis object may be created to represent a motion control axis (e.g., an electric motor, a shaft or other device driven by an electric motor, and so on). New instances of the output cam object may be created to represent new output cams. An axis instruction may then be incorporated in the user program to invoke the services of one of the axis objects, an output cam instruction may be incorporated into the user program to invoke the services of the output cam object, and so on. The axis and output cam instructions may then be executed by a microprocessor-based control unit, for example, to control movement of the motion control axis and to control one or more output devices responsive (directly or indirectly) to a position (e.g., absolute position, relative position, delta position, etc.) of the motion control axis, respectively. If an object-oriented approach is used, the axis instruction controls movement of the motion control axis by utilizing the services of the axis object, and the output cam instruction controls the state of one or more output devices by utilizing the services of an output cam object. Of course, it should be understood that these features, and all of the other features described herein, may also be implemented without using object-oriented techniques.

Figure 2:
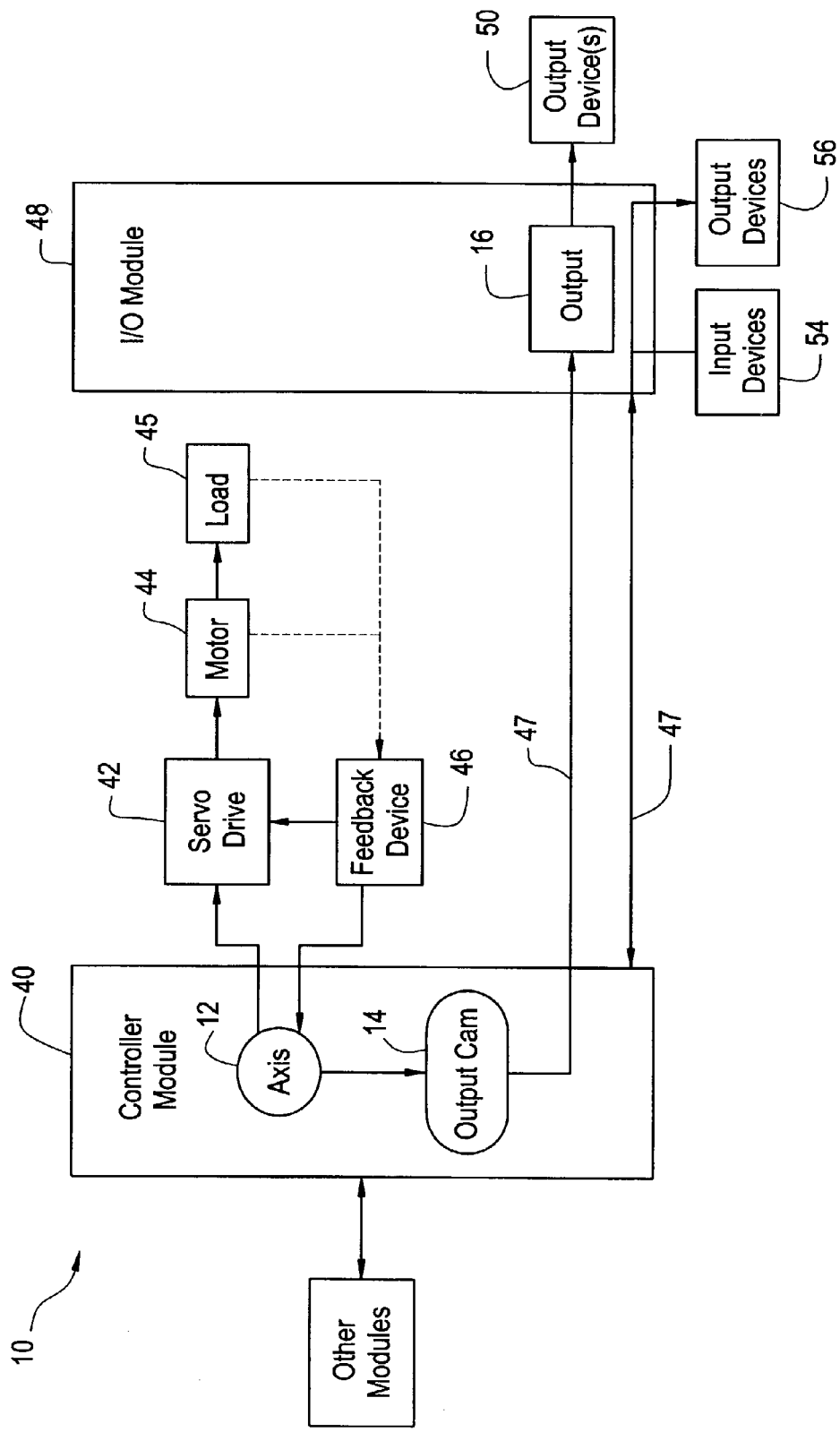
FIG. 2 is an embodiment motion control system in which output cam functionality is provided in a controller module.

Referring now also to FIG. 2, FIG. 2 shows one embodiment of a hardware implementation of the motion control system 10 described by the block diagram of FIG. 1. From a hardware perspective, the motion control system 10 comprises a controller module 40, a servo drive 42, a motor 44, a feedback device 46, an I/O module 48, and one or more output devices 50. The modules 40 and 48 may, for example, be a controller module and an output module, respectively, of a rack-mounted programmable controller system. The feedback device 46 may, for example, be an encoder. The axis block 12 is control logic that is stored and executed in the controller module 40 and that is used to control the motor 44. If a programmable controller system is used, the axis block 12 may also be stored and executed in a separate motion control module rather than being embedded in the controller module 40.

The axis block 12 controls the motor 44 responsive to inputs from the jog block 18, the move block 20, the time cam block 22, the gear block 24, and the position cam block 28. The jog block 18 permits the user (via a jog instruction) to specify a new velocity at which the shaft of the motor 44 is to move. The move block 20 permits the user (via a move instruction) to specify a new position for the shaft of the motor 44. The time cam block 26 permits the user (via a time cam instruction) to specify an axis position profile which specifies axis position as a function of time. The gear cam block 28 permits the user (via a gear instruction) to specify an electronic gearing relationship between the shaft of the motor 44 and the shaft of another motor (not shown) in the system 10. The position cam block 26 permits the user (via a position cam instruction) to specify an axis position profile which specifies axis position for the shaft of the motor 44 as a function of a position of the shaft of another motor (not shown) in the system 10. In the case of the gear block 28 and the position cam block 30, it will be appreciated that these blocks will receive inputs from other axis blocks similar to the axis block 12, which may in turn receive inputs from motion blocks similar to the motion blocks 18. It is therefore seen that the complexity of the motion control system 10 can be increased by providing multiple axes (and therefore multiple motors or other devices) and defining various relationships between the axes. Also, as described below, the number of output cam blocks 14 is not limited in any way. Other blocks, objects, and instructions may also be used.

As shown in FIG. 2, the axis block 12 provides a control signal to the servo drive 42, which is operative to control the motor 44 in accordance with the control signal. For example, the control signal may be a velocity reference signal, and the servo drive 42 may be operative to control the speed of the motor 44 so as to track the motor speed commanded by the velocity reference signal provided by the axis block 12. The position of the motor 44 is monitored by the feedback device 46 which provides feedback information to the axis block 12. Alternatively, the feedback device 46 may be used to monitor the position of a device driven by the motor 44.

Figure 3:
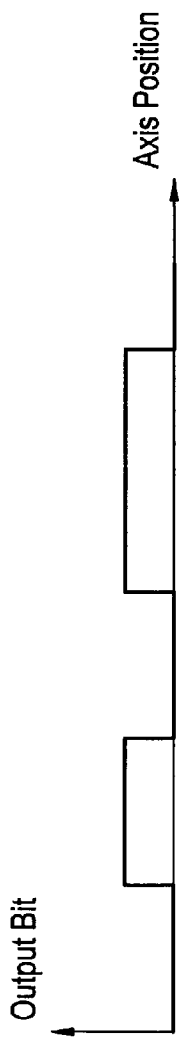
FIG. 3 shows control of an output device responsive to axis position.

The axis block 12 is coupled to the output cam blocks 14, which are in turn are coupled by way of the output blocks 16 to the output devices 50. Each output cam block 14 comprises control logic that is stored and executed in the controller module 40 (or other microprocessor-based control unit) and that is used to control output states of the output devices 50. The output block 16 may, for example, be a bit in memory that represents the desired output state of one of the output devices 50. The output module 48 may comprise one or more output circuits (not shown) coupled between the bits in memory and the output devices 50. The output cam block 14 is operative to receive information regarding motor position from the feedback device 46, and use the position information to control the output states of the output devices 50 in a predetermined manner. Typically, the operation of the output devices 50 will at least to some extent be cyclic, and the output cam block 14 synchronizes the operation of the output devices 50 to rotation of the shaft of the motor 44 (or to movement of a device driven by the shaft of the motor 44). Control of one output device 50 responsive to axis position is shown in FIG. 3. FIG. 3 shows a cam profile comprising two cam elements that control an output device 50. This relationship can be viewed as a master/slave relationship with the axis 12 representing the master and the output block 16 representing the slave.

In practice, each output cam block 14 is responsible for one output block 16, which may comprise a predetermined number of output bits, such as thirty-two output bits. As will be described below, each single output bit can be programmed separately with an output cam profile, and compensated for position offset and time delay. Therefore, each output block 16 may be connected to thirty-two different output devices 50.

Also shown are input devices 54 and additional output devices 56. The I/O devices 54 and 56 are coupled to the I/O module 48, but are not controlled by any output cam block 14. Thus, the output cam block 14 is capable of implementing output cam control over output devices 50 that are connected to the same I/O module 48 as other output devices 56 in the system.

A variety of techniques may be used to transmit control signals to the output device 50 in response to output cam processing by the output cam block 14. In one configuration, the controller module 40 maintains an I/O image table for each of the input/output devices to which it is connected. When the output cam block 14 determines that the output device 50 should be turned on, the output cam block 14 turns on a bit in the I/O image table, and the controller module 40 sends a message by way of a communication network 47 to the I/O module 48 to cause the output device 50 to turn on. The communication network 47 may, for example, be a network implemented using a back plane of a rack that houses the modules 40 and 52, a remote I/O network, or other suitable network. In this regard, it may be noted that the output cam block 14 is embedded in the controller module 40, which also controls the other output devices 56 that are not controlled using output cam functionality. The other output devices 56 may be connected to the I/O module 48 or to other output modules that operate under the control of the controller module 40. Therefore, when the message is sent from the controller module 40 to the I/O module 48 that causes the output device 50 to change state, this state change message is typically sent as part of a larger message that also includes control signals for the other output devices 56 connected to the I/O module 48. Typically, in some existing programmable controller systems, I/O messages are sent between a controller module and an output module once per update cycle, which is typically in a range of milliseconds to tens of milliseconds. Therefore, assuming a message of this type is used in the configuration of FIG. 2, then the timing accuracy with which one of the output devices 50 can be controlled is determined by the course update period and, in this example, is in the milliseconds to tens of milliseconds range.

In another embodiment, in order to improve accuracy, the controller module 40 sends the I/O module 48 a state change scheduling message to schedule when one of the output devices 50 should be turned on and off, and the I/O module 48 is responsible for controlling the precise instant at which the output device 50 changes state. In this configuration, the message that is sent to the I/O module 48 includes a time stamp that instructs the I/O module 48 when to change the state of the output device 50. The controller module 40 and the I/O module 48 have a common understanding of time, that is, their clocks are synchronized with a high degree of accuracy. In one configuration, the I/O module 48 further subdivides the update cycle into sub-update cycles, and the output cam operation is assigned to be performed during one of the sub-update cycles in accordance with the time stamp (that is, the operation is assigned to a time slot best representing its relative desired position within the update cycle). This allows the I/O module 48 to change the state of the output device 50 between I/O messages from the controller module 40. This also allows multiple cam events for a single output device 50 to be processed each update cycle, because each event can be assigned to an appropriate sub-update period. In this configuration, using current programmable controller technology, the output module 50 is able to change the state of the output device 50 to an accuracy in the range of tens to hundreds of microseconds.

Referring now to FIG. 4, in another embodiment, the output cam block 14 is located in an output cam module 52. The output cam module 52 may be constructed in a manner that is similar to the I/O module 48, although it may include a more powerful microprocessor and larger memory than would otherwise typically be employed in order to provide sufficient processing power to store and process the control logic that implements the output cam block 14. The output cam module 52 receives a feedback signal directly from the feedback device 46, or a separate feedback device may be provided which is dedicated for use by the output cam module 52. If the feedback signal is received directly from the feedback device 46, the feedback signal may either be shared with the controller module 40, or the output cam module 48 may receive the feedback signal but then digitally relay the feedback information back to the controller module 40. The output block 16 is also located in the output cam module 52, and is used to connect the output cam module 52 to the output devices 50. In this configuration, the control signals used to control the output devices 50 are generated at the output cam module 52, which controls the state of the output devices 50 based on the position information pertaining to the motion control axis from the feedback device 46. Accordingly, flexibility exists to control the output devices 50 without regard to the fixed update cycles of the controller modules 48 and without the need to transmit control signals over the communication network 47. Accordingly, using current programmable controller technology, the output cam module 52 is able to change the state of the output device 50 to an accuracy in the range of, for example, about five to fifty microseconds. In another configuration, the output cam module 52 supports multiple output cam blocks 14 per motion axis. In this case, the output cam module 52 connects to a separate I/O module of the type shown as I/O module 48 in FIG. 2. This option provides capability to control additional output devices 50 at a performance level between execution by the controller module 40 and execution by the output module 52.

The output cam module 52 provides input and output updates through the standard I/O connection. As a result, the inputs and outputs are readily available for user access in a manner similar to the one of the output module 48.

In the preferred embodiment, therefore, the output cam block 14 is fully integrated into the motion control system 10. The output cam instructions (described below) associated with the output cam block 14 may be in the same user program as the axis motion control instructions associated with the axis block 12 and the motion blocks 18. Each of these instructions may be, for example, instructions available to a user in a common ladder logic programming language. Therefore, a single programming interface on a single computer may be used to program the axis block 12 (along with the motion blocks 18) and the output cam block 14. It is not necessary to program the axis block 12 and the output cam block 14 using two unrelated different programming interfaces on different computers. This also facilitates troubleshooting, because the operation of the axis block 12 and the motion blocks 18 preferably can be monitored and debugged simultaneously with the operation of the output cam block 14 and the output devices 50, and because the programming interface that is used to program the blocks 12–18 preferably resides on a single computer. Monitoring and debugging are also simplified because the output cam logic preferably operates in a common time reference as the axis motion control logic.

Additionally, integration of the output cam block 14 into the motion control system 10 facilitates coordinating arming and disarming of an output cam with the same control logic that controls the motion control axis. Therefore, there is no need to transmit messages back and forth between two separate pieces of control logic. This results in an ability to time output cam arming and disarming more accurately and in a manner which is more responsive to system conditions. Likewise, compensation of camming operations is easier to adjust during execution of the user program. The current position of the motion control axis may be monitored and adjustments in compensation may be timed more accurately.

Further, it may be noted that the block diagram of FIG. 1 may be implemented, using either the architecture of FIG. 2 (including both the normal I/O messaging and the I/O scheduling variations) or the architecture of FIG. 4, and this provides significant benefits to the user. The user may program the system 10 without necessarily knowing whether it will be possible to place the output cam block 14 in the controller module 40, or whether the timing accuracy required by a particular application will be sufficiently high that the dedicated output cam module 52 will be needed. Therefore, a user may program the entire system 10, determine whether the configuration of FIG. 2 is sufficient and, if it is not sufficient, then adopt the configuration of FIG. 4. As will be detailed below, the change in hardware is generally transparent to the user from a programming standpoint, except that a setting in the output cam instructions (discussed below) is adjusted to reflect the change.

Moreover, it may be noted that the arrangement shown is readily scalable. Although the motion control system of FIG. 1 is shown with a single output cam block 14 receiving an input from the axis block 12, additional output cam blocks 14 can also be configured to receive an input from the axis block 12. From a system architecture standpoint, there is no limitation on the number of output cam blocks 14 that may be coupled to an axis block 12, and therefore no limitation on the number of output devices 50 that may be controlled, except of course that additional hardware may be needed.

Finally, the arrangement shown is integrated from a data standpoint, and this results in minimal hardware. In the embodiment of FIG. 4, for example, there is no need to provide one position feedback device for the controller module 40 and another position feedback device for the output cam module 48. The position information obtained by the feedback device 46 is used not only by the output cam block 14, but also by the axis block 12. This information is provided to the controller module 40, and can be used in other parts of the system 10. There is no need for multiple feedback devices to monitor the same axis for different control systems. Additionally, I/O status data may be shared between all parts of the system 10, such that the output cam blocks 14 may have access to I/O status data from other parts of the system 10, and blocks in other parts of the system 10 may have access to I/O status data from the output cam blocks 14 and/or the output blocks 16.

Figure 5:
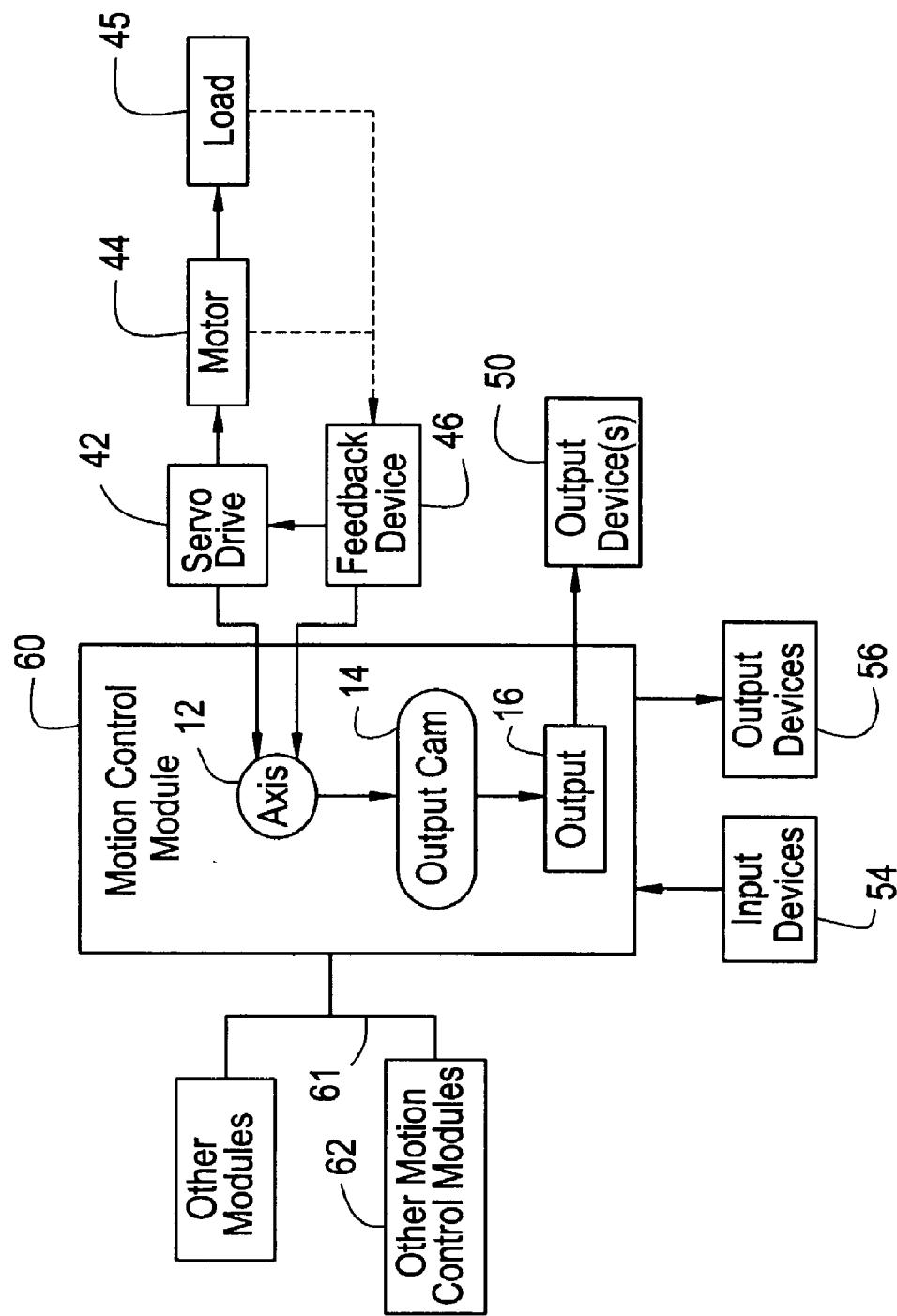
FIG. 5 is an embodiment of a motion control system in which output cam control logic is provided in a motion control module.
Figure 6:
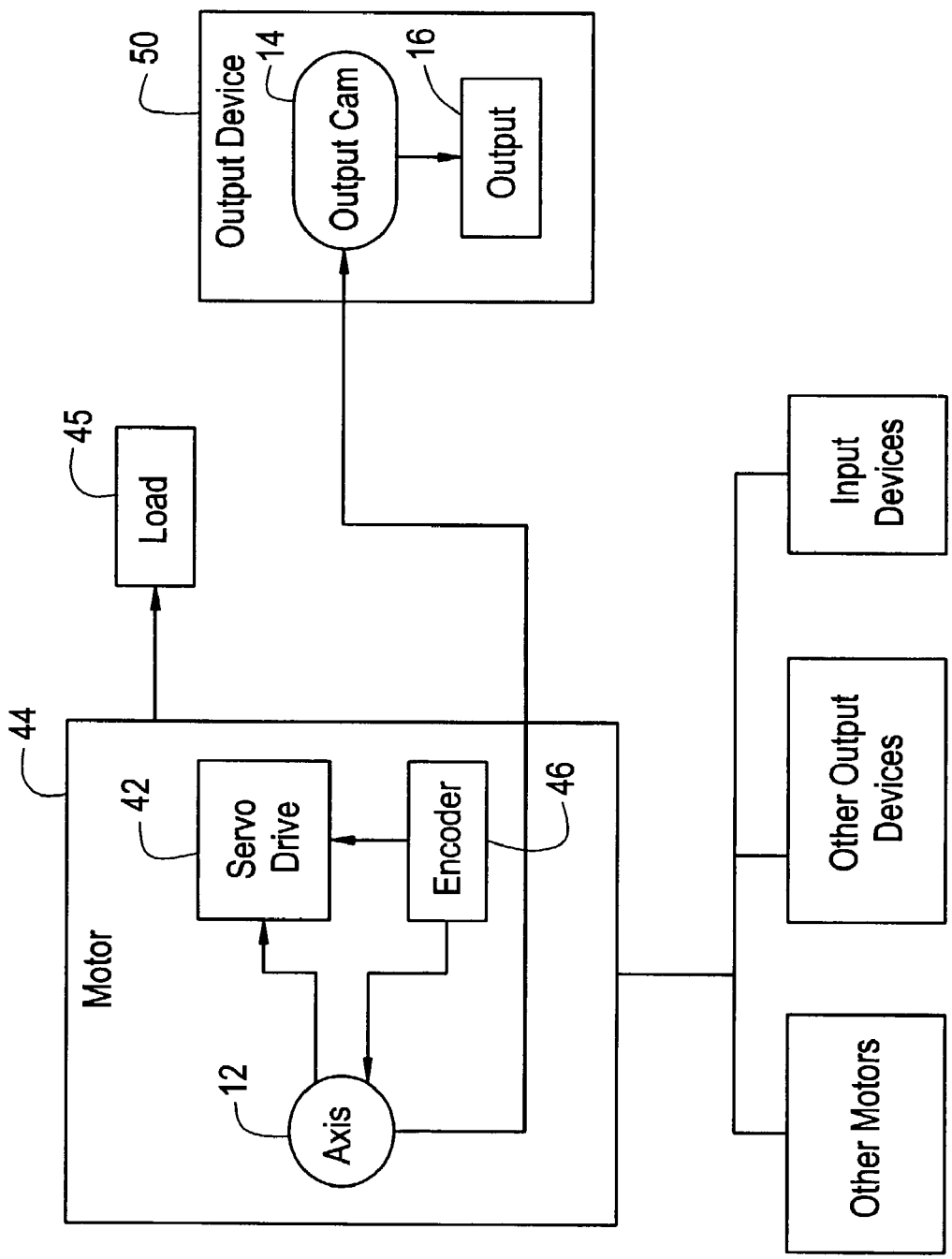
FIG. 6 is an embodiment of a motion control system in which output cam control logic is provided in an output device.
Figure 7:
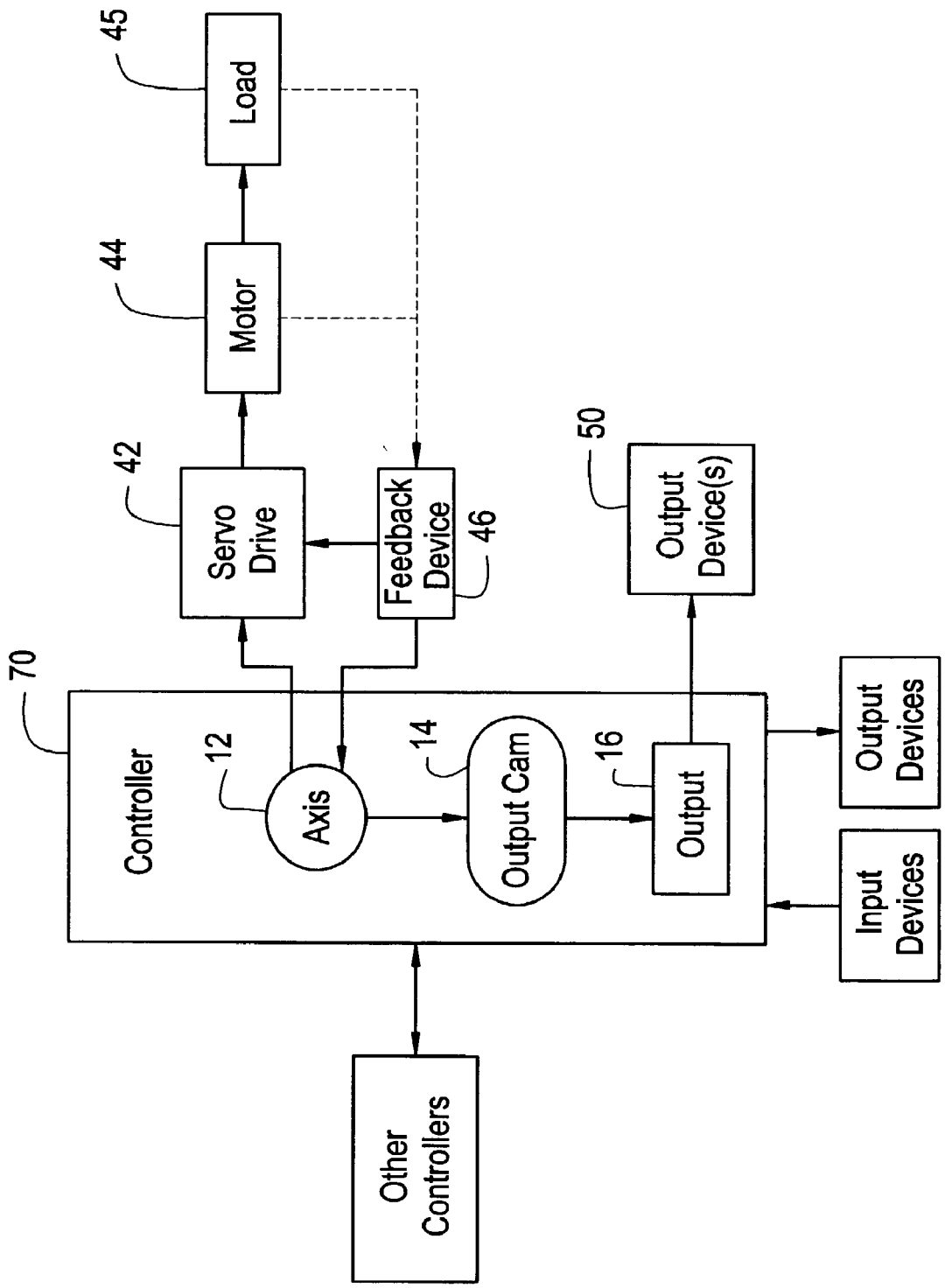
FIG. 7 is an embodiment of a motion control system in which output cam control logic is provided in a PC-based controller.

Referring now to FIGS. 5–7, a number of additional hardware implementations are shown that also share each of the same advantages described above in connection with the embodiments of FIGS. 2 and 4. FIG. 5 shows an implementation that embodies a distributed control design philosophy. In the embodiment of FIG. 5, the axis block 12 and the output cam block 14 are both provided in a motion control module 60, which is operative to control the motor 44, to receive inputs from the input devices 54, and to control the output devices 50 and 56. The control module 60 includes I/O ports to which input/output devices 50, 54, and 56 can be connected. The motor 44 may be controlled as specified by one or more motion control instructions (e.g., jog, move, time cam, gear, or position cam instructions) as described above in connection with FIG. 2. The motion control module 60 maintains an I/O image table of the type discussed above in connection with the controller module 40. The motion control module 60 is coupled to other similarly configured motion control modules 62, which are also coupled to input devices, output devices, and motors. The output cam block 14 controls the output devices 50 responsive to the position of the motor 44 or other motion control axis, as previously described. I/O status information for the input device 54 and the output devices 50 and 56 is transmitted to the modules 62 over a communication network 63.

FIG. 6 shows another implementation that also embodies a distributed control design philosophy. In the embodiment of FIG. 6, the servo drive 42, the feedback device 46, and the control logic associated with the axis block are integrated into the motor 44. Additionally, the control logic associated with the output cam block 14 and the output block 16 are integrated into the output device 50. The motor 44 and the output device 50 are therefore each provided with a suitable microprocessor and memory to store and process the control logic. The motor 44 may be controlled as specified by one or more motion control instructions (e.g., jog, move, time cam, gear, or position cam instructions) as described above in connection with FIG. 2. The motion control instructions may be executed at the motor 44, for example. The output device may, for example, be an electromechanical actuator. The output device 50 includes the output cam block 14, receives position information from the motor 44, and performs the output cam control logic on the position information. The output cam block 14 controls the output device 50 responsive to the position of the motor 44 or other motion control axis, as previously described. The output device 50 maintains at least a portion of an I/O image table of the type discussed above in connection with the controller module 40. Other similarly configured motors and output devices may be provided, and I/O status information may be transmitted between each of these devices.

FIG. 7 shows another implementation in which the axis block 12, the output cam block 14, and the output block 16 are provided in a microprocessor-based control unit 70, which may for example be a personal computer based or other embedded controller. The motor 44 may be controlled as specified by one or more motion control instructions (e.g., jog, move, time cam, gear, or position cam instructions) as described above in connection with FIG. 2. The motion control instructions may be executed at the controller 70, for example. The output cam block 14 controls the output device 50 responsive to the position of the motor 44 or other motion control axis, as previously described. The output device 50 maintains at least a portion of an I/O image table of the type discussed above in connection with the controller module 40. Other similarly configured controllers 70 may be provided, and I/O status information may be transmitted between each of these devices. Of course, each of the above embodiments of FIGS. 2 and 4–7 could also be used in combination.

B. Output Cam Programming

1. Instructions

Figure 8:
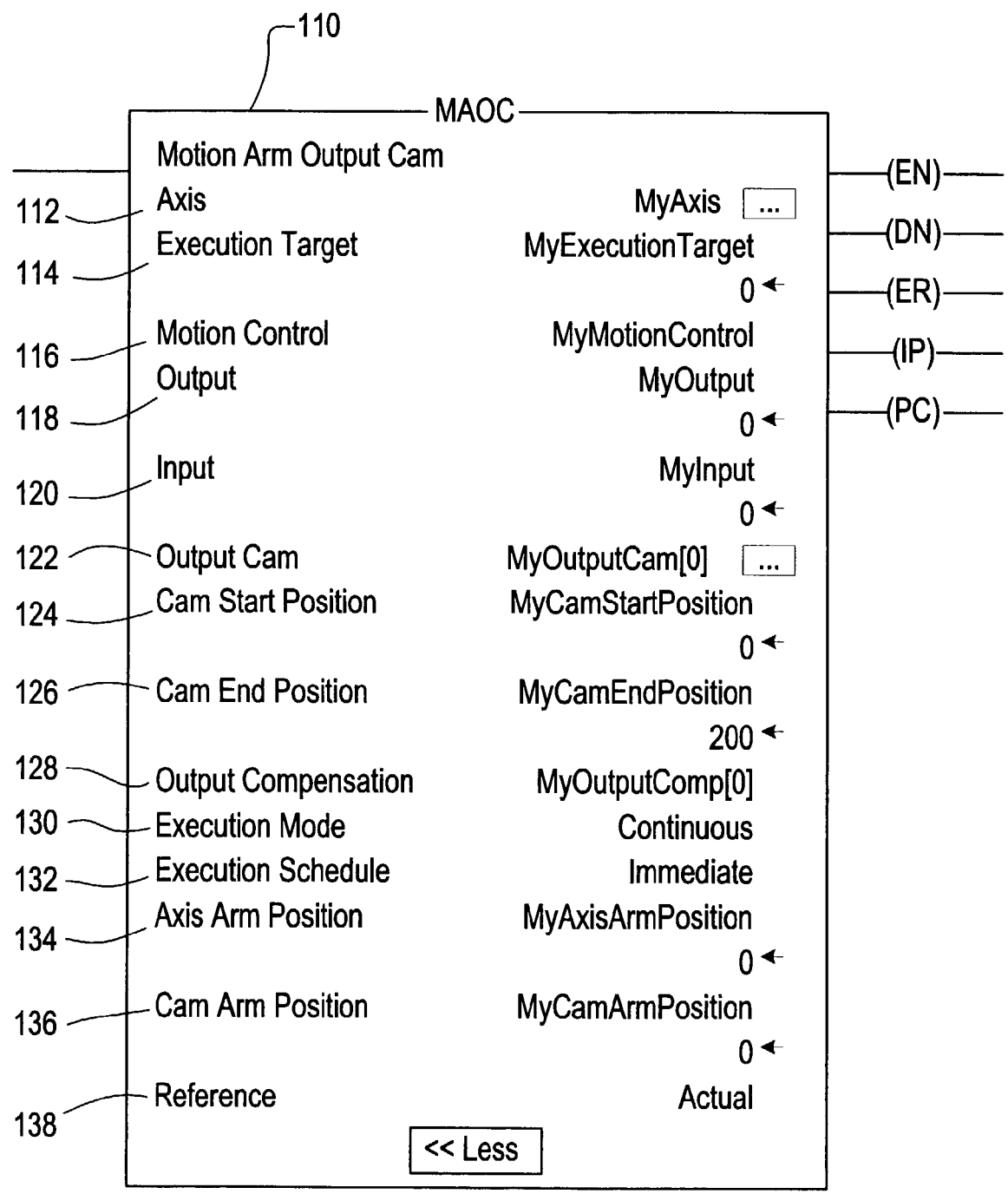
FIG. 8 is an arm output cam instruction usable to program control logic in the motion control systems of FIGS. 2 and 4–7.
Figure 9:
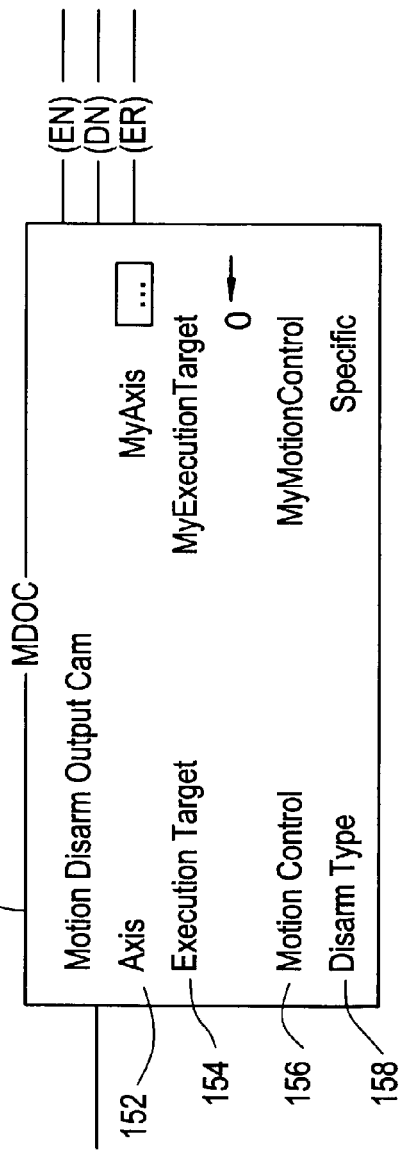
FIG. 9 is a disarm output cam instruction usable to program control logic the motion control systems of FIGS. 2 and 4–7.

Referring now to FIG. 8–9, as mentioned above, camming operations are achieved through the use of one or more output cam instructions. The output cam instructions are part of the same programming language (e.g., a ladder logic programming language) as the instructions used in connection with the axis block 12 and the motion blocks 18, and are capable of being used in the same user program as the axis and motion instructions. The output cam instructions control the manner in which camming operations are performed.

In the preferred embodiment, the output cam instructions comprise two instructions: an arm output cam instruction 110 (FIG. 8) and a disarm output cam instruction 150 (FIG. 9). The arm output cam instruction 110 is used to initiate the arming of an output cam between a specified axis and the output devices 50, and the disarm output cam instruction 150 is used to terminate the output cam.

If an object oriented approach is used, then in addition to the services that objects available in an object-oriented programming interface typically offer (create instance, delete instance, etc.), the output cam object preferably offers an arm service, an update service, and a disarm service. The arm service is invoked by the arm output cam instruction 110, and details of this service will become apparent from the discussion of the details of the arm output cam instruction 110, below. Executing the arm output cam instruction 110 is sometimes referred to herein as initiating an output cam. The update service is invoked after the arm output cam instruction 110 has been executed and before the disarm output cam instruction 150 has been executed. The update service is invoked at regular update cycles, and is responsible for performing latch and unlatch operations at each update cycle. The disarm service is invoked by the disarm output cam instruction 150, and details of this service will become apparent from the discussion of the details of the disarm output cam instruction 150, below. Executing the disarm output cam instruction 150 is sometimes referred to herein as terminating an output cam. The arm output cam instruction 110 is then executable to control one or more output devices responsive (directly or indirectly) to a position (e.g., absolute position, relative position, delta position, etc.) of the motion control axis. In the context of an object-oriented environment, this occurs by virtue of the arm output cam instruction 110 utilizing the arm and update services of an output cam object. The attributes of the output cam object may indicate, for example, whether an output cam has been initiated, whether an output cam is pending, whether an output cam position is locked to another axis such as a master axis, and whether an output cam is transitioning between pending status and active status.

FIG. 8 shows the arm output cam instruction 110 as it appears to the programmer in one embodiment in which the output cam instruction is an instruction in a ladder logic programming language. In the preferred embodiment, as shown in FIG. 8, the arm output cam instruction 110 includes the following operands: an axis operand 112, an execution target operand 114, a motion control operand 116, an output operand 118, an input operand 120, an output cam operand 122, a cam start position operand 124, a cam end position operand 126, an output compensation operand 128, an execution mode operand 130, an execution schedule operand 132, an axis arm position operand 134, a cam arm position operand 136, and a reference operand 138. As described below, the operands 112–138 are used to specify user-configurable parameters that configure the output cam initiated by execution of the arm output cam instruction 110. These operands will now be described in greater detail.

The axis operand 112 specifies the position input to the output cam. As previously indicated, there may be multiple axis blocks 12 in the motion control system 10, and the purpose of the axis operand 112 is to specify which one of the axis blocks 12 is to be used as a position input to the output cam. If the output cam instruction 110 is to be executed by the controller module 40, the axis operand 112 can be assigned to be a servo, feedback only, virtual, or consumed axis. If servo axis is selected, the axis block 12 corresponds to a servo drive, motor and/or load, and feedback device of the type shown with reference numbers 42, 44, 45 and 46 in FIGS. 2–7. If feedback only axis is selected, the axis block 12 corresponds to a feedback device of the type shown with reference number 46 in FIGS. 2–7. If virtual or consumed axis is selected, the axis block does not correspond to any particular hardware, but is an axis that is represented internally to facilitate programming the system 10. In the case of a virtual axis, position values for the virtual axis are internally generated by the control logic that implements the virtual axis block. Typically, multiple gear blocks (such as the gear block 28) and/or multiple position cam blocks (such as the position cam block 30) are coupled to receive the position information from the virtual axis as an input, and to provide an output to another axis block based on the position information from the virtual axis. This allows multiple axes to be synchronized to a common source of position reference values. In the case of a consumed axis, position values for the consumed axis are generated by a motion control unit which is typically not integrated with the remainder of the system 10 (e.g., where the two systems are provided by different manufacturers). In this case, position information for the motion control axis controlled by the motion control unit may be transmitted over a network to the controller module 40, and the controller module 40 then consumes the position information from the non-integrated motion control unit. The position of the motion controlled axis controlled by the non-integrated motion control unit is then represented using a consumed axis.

The ability to support multiple axis types is advantageous. For example, because the servo axis is supported, the output cam block 14 can utilize commanded position values for position information rather than feedback information from the feedback device 44. Also, the ability to specify servo axis avoids the need to specify feedback only (and thus avoids the need for additional hardware) in some instances. Moreover, because the feedback only axis type is also supported, the output cam instruction 110 can be executed by the output cam module 52, which receives position feedback from the motor 44 but does not control the motor 44. Thus, if the output cam instruction 110 is to be executed by the output cam module 52, the axis operand 112 may be assigned to be a feedback-only axis and to an axis assigned to the output cam module 52. Further, because the virtual axis is supported, the output cam block 14 may be synchronized to the same common source of position reference values as used by axis blocks of the system 10.

The execution-target operand 114 specifies a specific output cam from the set that is connected to the axis specified by the axis operand 112. As previously indicated, there may be multiple axis blocks 12 in the motion control system 10 and, for each of the axis blocks 12, there may be one or more output cam blocks 14. The purpose of the execution target operand 114 is to specify which one of the output cam blocks 14 is to execute the arm output cam instruction 110. Of course, the output cam block 14 specified by the operand 114 should be connected to the axis block specified by the operand 112. Based on the value assigned the execution target operand 114, the output cam block 14 may either be an output cam block that is implemented using control logic that is executed in the controller module 40 or an output cam block that is implemented using control logic that is executed in the output cam module 52. Alternatively, the execution target operand 114 may specify an output cam block that is implemented using control logic that is executed in the motion control module 60 of FIG. 5, the actuator 50 of FIG. 6, or the controller 70 of FIG. 7, if one or more of the embodiments of FIGS. 5–7 is employed.

The motion control operand 116 stores status information during execution of the arm output cam instruction. This information includes whether execution is in process, error information, and so on. The operand is another variable in the system 10 that can be examined by other parts of a user program used to provide initiation and run-time status information as the arm output cam instruction 110 executes.

The output operand 118 is a predetermined number (e.g., thirty-two) of output bits that can be set and reset depending on the specified output cam. As previously indicated, each output cam block 14 is responsible for one output block 16, which comprises a predetermined number (e.g., thirty-two) of output bits, which can be a memory location or a physical actuator output. The output operand 118 specifies which output bit/device is to be affected by the execution of the arm output cam instruction 110.

The input operand 120 is a predetermined number (e.g., thirty-two) of input bits that can be used as enable bits to control operation of the specified output cam. As will be described below, the latching/unlatching of an output device 50 may be controlled using an enable bit as an input. The input operand 120 permits the input bit that is to be used as an enable bit to be specified. The input can be either a memory location or a physical input from a sensor or other device.

The output cam operand 122 is an array of output cam elements that allows the latch/unlatch behavior of an output bit/device to be configured. A cam element comprises a latch/unlatch combination for an output bit. The number of cams per output bit/device defines the size of this array. For execution by the controller module 40, the array size is limited by the available memory of the controller module 40. For execution by the output cam module 52, the array size is limited by the available memory of the output cam module 52. For execution by the controller module 40, changes to the output cam will take effect immediately. For execution by the output cam module 52, changes to the output cam takes effect at the execution of an arm output cam instruction 110. The output cam operand 122 is described in greater detail below.

The cam start position operand 124 and cam end position operand 126 define the left and right boundary of the output cam range. When the cam position moves beyond the cam start or cam end position, the behavior of the output cam is defined by the execution mode operand 130 and the execution schedule operand 132, described below. Changes to the cam start or cam end position take effect at the execution of the arm output cam instruction 110.

Preferably, the cam start position and the cam end position may be specified using floating point numbers. The use of floating point numbers is advantageous because it increases the range of values that may be represented, and allows the resolution of the numbers to be automatically re-scaled depending on the exponent. The use of floating point values allows values to be specified with precision regardless of motor speed. Also in the preferred embodiment, the cam start position and the cam end position may be specified in terms of "user units." For distance, for example, a user unit may be the length of one package. This avoids the need for the user to specify distance in terms of encoder counts, for example, which may be less intuitive for the user. Preferably, floating point values and user units are used wherever time/distance values are specified.

The output compensation operand 128 is an array of output compensation elements. The array indices correspond to the output bit numbers. The number of the highest compensated output bit defines the minimum size of this array. In the case of execution by the controller module 40, changes to the output compensation will take effect immediately. In the case of execution by the output cam module 52 changes to the output compensation will only take effect at the execution of the arm output cam instruction 110. The output compensation operand 128 is described in greater detail below.

The execution mode operand 130 allows the execution mode to be selected. Depending on the selected execution mode, the output cam behavior may differ, when the cam position moves beyond the cam start or cam end position. The available execution modes include the following modes: once, continuous, and persistent, For the once mode, after the cam position moves beyond the cam start or cam end position, the output cam is disarmed and the process complete bit of the motion instruction is set. For the continuous execution mode, after the cam position moves beyond the cam start or cam end position, the output cam continues on the opposite side of the output cam range. For the persistent execution mode, after the cam position moves beyond the cam start or cam end position, the output cam is disarmed. However, when the cam position moves back into the output cam range the output cam is rearmed. Persistent mode therefore provides support for machine motion which moves in one direction, stops, then moves in the reverse direction performing the same operations in both directions. Advantageously, therefore, the arm output cam instruction 110 provides support for multiple output cam execution modes.

The execution schedule,operand 132 allows different execution schedules to be selected that determine when an output cam block 14 (including individual cam profiles) associated with the output cam instruction 110 is to be armed. The available execution schedules include immediate, pending, forward only, reverse only, and bidirectional. For the immediate execution schedule, the output cam is armed immediately. For the pending execution schedule, the output cam is armed when the cam position of an armed output cam (i.e., a currently executing output cam) moves beyond its cam start or cam end position, thereby causing the output cam to be armed after execution of the currently executing output cam is complete. For the forward only execution schedule, the output cam is armed when the axis approaches or passes through the specified axis arm position in the forward direction. For the reverse only execution schedule, the output cam is armed when the axis approaches or passes through the specified axis arm position in the reverse direction. For the bidirectional execution schedule, the output cam is armed when the axis approaches or passes through the specified axis arm position in the forward or reverse direction.

The execution schedule operand 132 therefore provides flexibility to select different execution schedules, allowing the user to dynamically schedule profile changes to accommodate changes in product, machine operation, and so on. The option to select a pending execution schedule in particular supports dynamic changes to cam operation. For example, some packaging machines are designed to support dynamic changes to product size. When the product size changes, the output cam profiles typically also change. With the execution schedule operand 132, the output cam can be armed immediately, or armed based on axis position and direction (forward only, reverse only, or bidirectional), or armed when a currently executing output cam profile completes (pending). In the case of a pending execution schedule, the arm output cam instruction 110 is allowed to pend prior to product reaching a specified axis position, and then automatically arms when the current output cam instruction completes.

Figure 10:
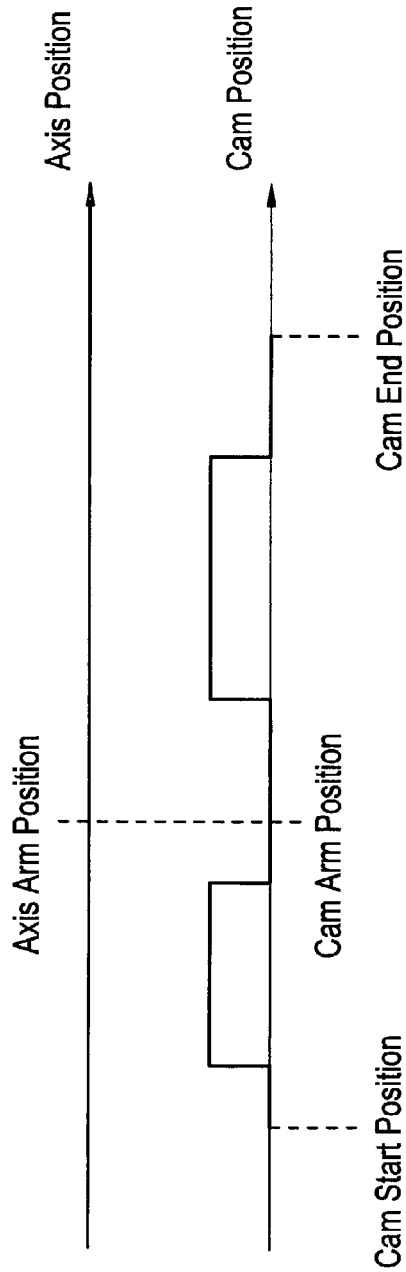
FIG. 10 shows operation of an axis arm position operand and a cam arm position operation of the output cam instruction of FIG. 8.

The axis arm position operand 134 defines the axis position where the output cam is armed, if the execution schedule operand 132 sets the execution schedule to either forward only, reverse only, or bidirectional and the axis moves in the specified direction. The cam arm position operand 136 defines the cam position that is associated with the axis arm position, when the output cam is armed. As described below, cam element position is preferably maintained separately from axis position, and the delta position of the motion control axis is monitored to ensure that the cam position moves at the same rate as the axis position. Changes to the axis arm or cam arm position will only take effect at the execution of the arm output cam instruction 110. Operation of the axis arm position operand 134 and the cam arm position operand 136 is shown in FIG. 10.

The reference operand 138 allows a position reference to be selected such that the output cam is connected to either the actual position of an axis (as measured by a feedback device such as the feedback device 46) or the command position of an axis (as commanded by a motion controller responsive to inputs from one of the motion blocks 18). Thus, the user is provided with the added-flexibility to select actual or commanded position reference when processing output cams. This is beneficial during startup and shutdown when machines operate at very slow speeds. During this time, output cam functionality is armed and outputs are affected. Due to the slow speed, actual feedback jitter affects cam operations by turning the outputs on/off multiple times as the actual position moves through cam latch and unlatch positions. This is an undesirable behavior for many of the output devices controlled by output cams. Allowing the user to select commanded position as the output cam reference eliminates jitter in output devices, because a commanded position value does not experience feedback jitter to the extent that the actual feedback position value experiences jitter. As an alternative, a built-in filter may be used to reduce jitter when monitoring actual position.

Referring again to FIG. 9, the disarm output cam instruction 150 will now be described. The disarm output cam instruction 150 initiates the disarming of one or more output cams connected to the specified axis. Based on the disarm type, the disarm output cam instruction 150 will disarm either all output cams or only a specific output cam. The corresponding output devices 50 will maintain the last state after the disarming. Alternatively, the last state after disarming may be user-configurable.

The disarm output cam instruction 150 has the following operands: an axis operand 152, an execution target operand 154, a motion control operand 156, and a disarm type operand 158. The axis operand 152 of the disarm output cam instruction 150 is similar to the axis operand 112 of the arm output cam instruction 110. The axis operand 152 specifies the position input (one of the axis blocks 12) of the output cam block 14 that is being disarmed. As described above, for execution by the controller module 40, the axis can be a servo, feedback only, physical, or consumed one. Likewise, for execution by the output cam module 52, the axis is a feedback axis and an axis assigned to the output cam module 52.

The execution target operand 154 defines a specific output cam block 14 from the set that is connected to the axis block 12 by the axis operand 152. The execution target operand 154 of the disarm output cam instruction 150 is similar to the execution target operand 114 of the arm output cam instruction 110. Based on the value assigned the execution target operand 154, the output cam block 14 is either an output cam block executed in the controller module 40 or in the output cam module 52.

The motion control operand 156 stores status information during execution of the disarm output cam instruction. This information includes whether execution is in process, error information, and so on. The operand is another variable in the system 10 that can be examined by other parts of a user program used to provide initiation and run-time status information as the disarm output cam instruction 150 executes.

The disarm type operand 158 permits the disarm type to be selected. Depending on the selected disarm type, one or more output cam blocks 14 are disarmed. The selected disarm type may be all, in which case all output cams connected to the axis block 12 specified by the axis operand 152 are disarmed. The selected disarm type may also be specific, in which case a specific output cam block 14 connected to the axis block 12 specified by the axis operand 152 and defined by the execution target operand 154 is disarmed.

2. Data Types a. Output Cam Operand

The output cam operand 122 allows the latch and unlatch operation of the output cam element to be configured. Latching refers to the rising edge of the cam element used to turn on an output bit. Unlatching refers to the falling edge of the cam element used to turn off the output bit.

Figure 11:
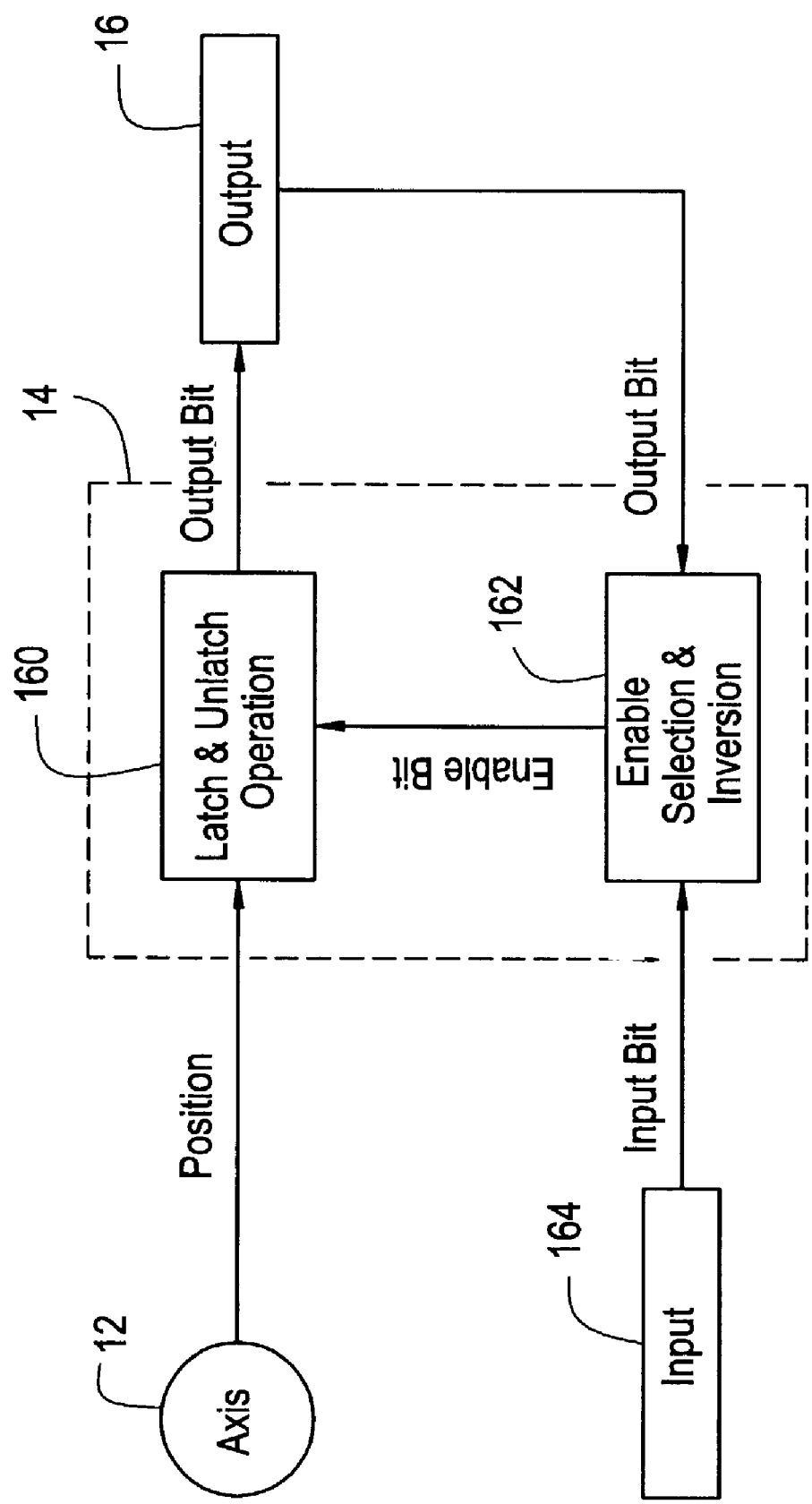
FIG. 11 shows relationships between the axis, input, and output that are defined by an output cam element.

FIG. 11 is a block diagram showing the operation of the output cam block 14 that takes into account the features provided by the output cam operand. As shown in FIG. 11, the output cam block 14 receives a position input from the axis block 12. The output cam block 14 includes latch and unlatch logic 160 and enable selection and inversion logic 162. If no enable bit is used, then the latch and unlatch logic 160 does not receive an input from the enable selection and inversion logic 162. Rather, the latch and unlatch logic 160 controls latching and unlatching of the specified output bit based on the parameters specified by a latch type, a unlatch type, a left cam position, a right cam position, and a duration parameter (as applicable) specified in the output cam operand 122. If an enable bit is used, then the latch and unlatch logic 160 further receives an input from the enable selection and inversion logic 162, as shown. The enable bit may be either one of the output bits in the output block 16 (allowing dependencies between cam elements to be established) or may be an input bit 164 from elsewhere in the system 10

(e.g., a sensor). In the event an enable bit is used, then an enable type parameter and an enable bit parameter of the output cam operand 122 is also used. These features will now be described in greater detail.

The output cam operand 122 is an array of output cam elements. As just indicated, the parameters specified by the output cam operand 122 include an output bit, a latch type, an unlatch type, a left cam position, a right cam position, a duration, an enable type, and an enable bit.

The output bit is set to a value (e.g., from 0 to 31), corresponding to the different output bits (e.g., thirty-two different bits) for which the output cam block 14 is responsible. Each cam element in the array has an output bit parameter. The output bit is used to assign the cam element to a particular output bit.

Figure 12:
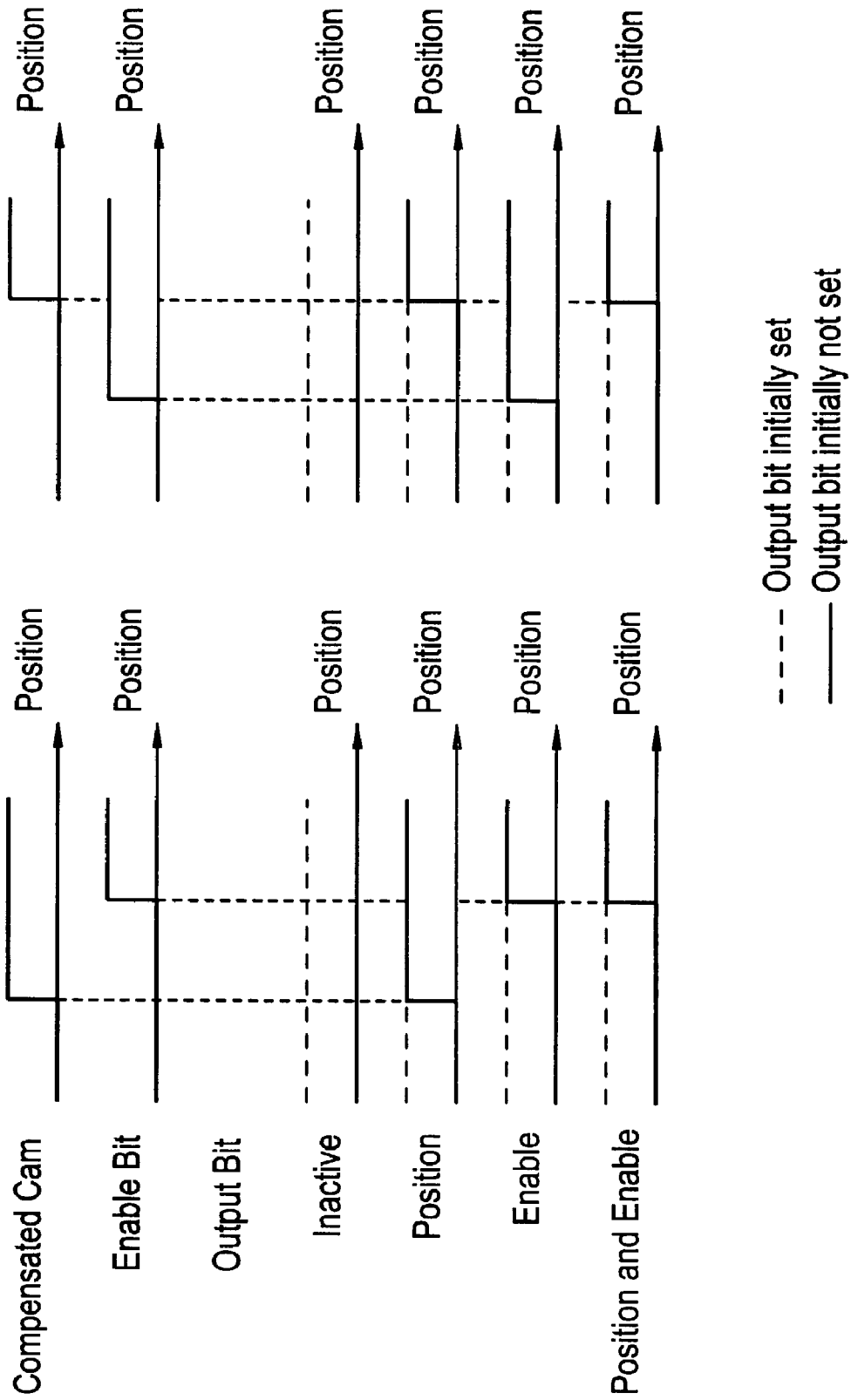
FIG. 12 shows the effect of a selected latch type on an output bit for different compensated cam and enable bit combinations as function of position.

The latch type describes the type of condition that is used to determine whether the output bit is latched. The latch type may be set to one of the following conditions: inactive, position, enable, and position and enable. FIG. 12 shows the effect of the selected latch type on an output bit for different compensated cam and enable bit combinations as function of position. If the latch type is set as inactive, the corresponding output bit is not changed. Configuring the latch type as inactive allows another instruction (other than an output cam instruction) in the user application task to change the state of (turn on) the output bit. This allows the state of the output bit to be changed directly by the application task, without using the output cam block 14. If the latch type is set as position, the corresponding output bit is set when the axis enters compensated cam range (additional description regarding the compensated cam range is contained below). If the latch type is set as enable, the corresponding output bit is set when the enable bit becomes active,. If the latch type is set as position and enable, the corresponding output bit is set when the axis enters the compensated cam range and the enable bit becomes active.

Figure 13:
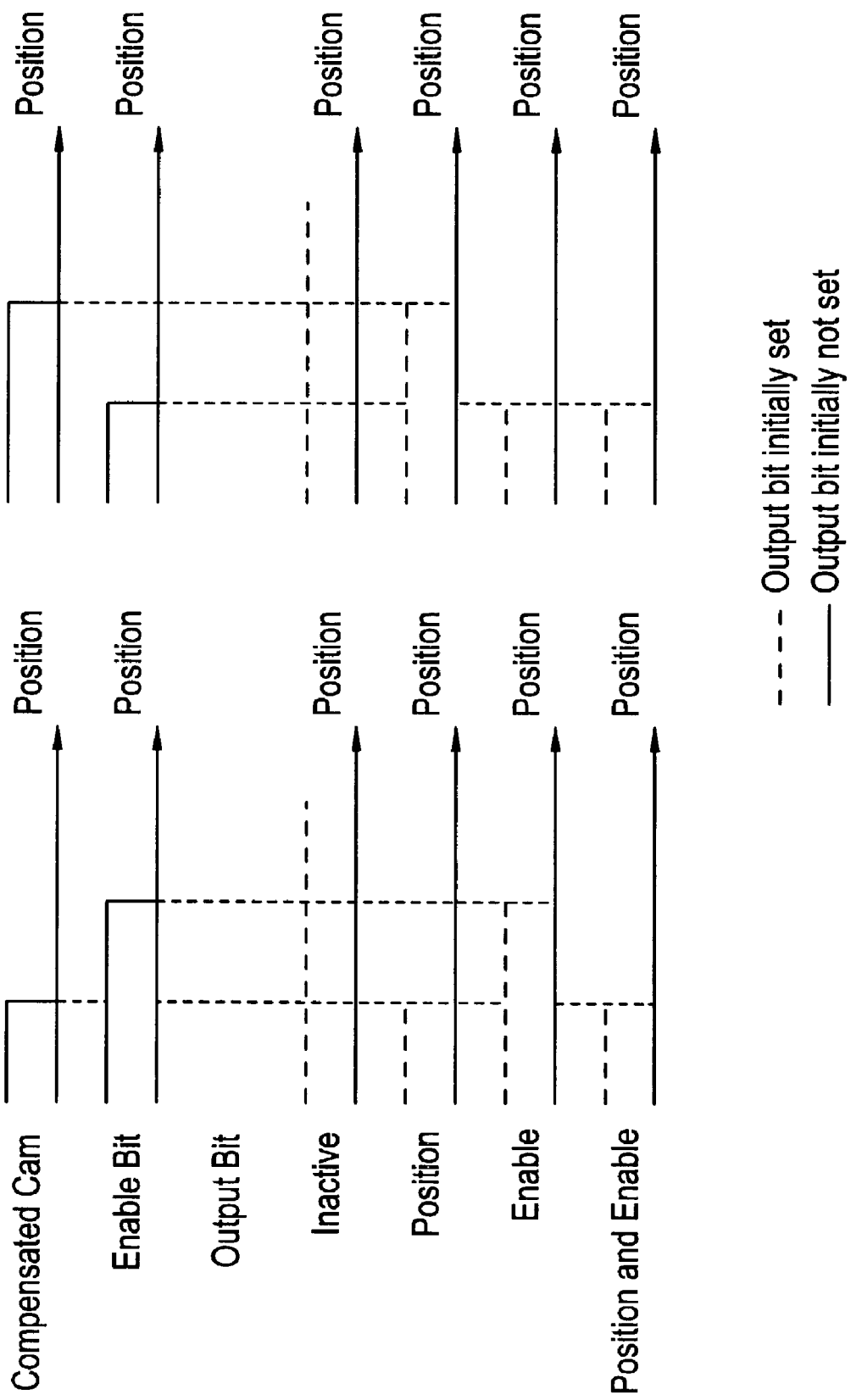
FIG. 13 shows the effect of a selected unlatch type on an output bit for different compensated cam and enable bit combinations as function of position.
Figure 14:
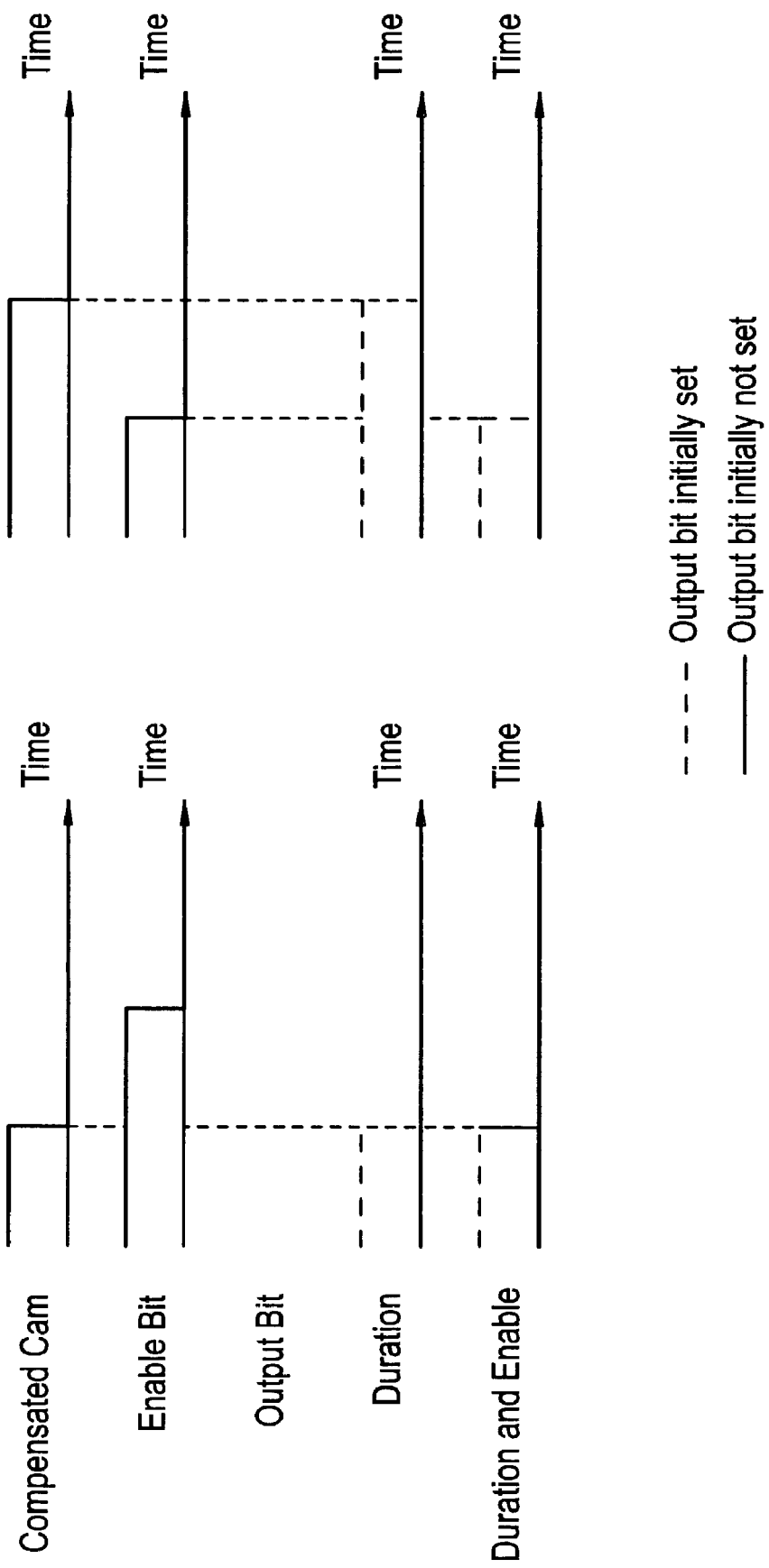
FIG. 14 shows the effect of a selected unlatch type on an output bit for different compensated cam and enable bit combinations as a function of time.

The unlatch type may be set to one of the following types of conditions: inactive, position, duration, enable, position and enable, duration and enable, and relative. FIG. 13 shows the effect of the selected unlatch type on the output bit for different compensated cam and enable bit combinations as function of position. FIG. 14 shows the effect of the selected unlatch type on the output bit for different compensated cam and enable bit combinations as function of time. If the unlatch type is set as inactive, the corresponding output bit is not changed. Configuring the unlatch type as inactive allows a user application task to change the state of (turn off) the output bit. If the unlatch type is set as position, the corresponding output bit is reset when the axis leaves the compensated output cam range. If the unlatch type is set as duration, the corresponding output bit is reset when the duration expires. If the unlatch type is set as enable, the corresponding output bit is reset when the enable bit becomes inactive. If the unlatch type is set as position and enable, the corresponding output bit is reset when the axis leaves the compensated cam range or the enable bit becomes inactive. If the unlatch type is set as duration and enable, the corresponding output bit is reset when the duration expires or the enable bit becomes inactive. If the unlatch type is set to relative, the corresponding output bit is reset when the axis has moved a predetermined amount or delta position since the output bit was initially set.

Advantageously, the relative unlatch type therefore allows the user to specify a position offset from the latch operation in which to unlatch the cam element. This feature may be useful in situations where, when an event is detected, an action is to occur for a predetermined amount of axis travel. For example, the presence of a rejected part (may cause a reject gate to open for the next ten inches of axis travel. A photo-eye may then be used to detect the presence of the product because its position on the belt is not guaranteed. The user then specifies in user units the distance the axis will travel following the latch event in which the unlatch event occurs. In the above example, the user specifies the latch type as "enable" (the reject detect photo-eye) and the unlatch type as "relative."

The left and right cam positions define the cam range of an output cam element. Specifically, if the latch or unlatch type is set to "position" or "position and enable" with the enable bit active, the left and right cam positions specify the latch or unlatch position of the output bit.

The duration defines the duration of an output cam element. Specifically, if the unlatch type is set to "duration" or "duration and enable" with the enable bit active, the cam duration specifies the time between the latching and the unlatching of the output bit. For duration values, the user units may, for example, be seconds.

The enable type parameter is used when the latch type or the unlatch type is set to enable. If the enable bit is based on one of the input bits 164, then the enable type may be set to either non-inverted input or inverted input. If the enable bit is based on one of the output bits in the output block 16, then the enable type may be set to either non-inverted output or inverted output. The enable bit parameter specifies which one of the input bits 164 (if the enable type parameter specifies non-inverted input or inverted input) or which one of the output bits in the output block 16 (if the enable type parameter specifies non-inverted output or inverted output) is used as an enable bit. If the enable bit is an input, the state of the input bit may correspond to the state of an input device (sensor) or to the state of any other piece of data in the system 10. If the enable bit is an output bit, the output state of the output bit may or may not be associated with a particular output device 50 coupled to the output block 16.

From the foregoing, a number of additional advantages may be apparent. First, the latch/unlatch operations may be controlled based on multiple different possible event states. For example, the user is permitted to control latch/unlatch operations based on the state of an associated enable bit. Thus, the user may specify the turn on (latch) behavior as position and enable, and the turn off (unlatch) behavior as duration. The enable input can be any piece of I/O data that is available in the controller module 40 (or the output cam module 52). Thus, the enable input may be received from any of a variety of different sensors (e.g., a presence sensor to detect the presence of a production unit) and/or based on information acquired from anywhere in the motion control system 10. There is no need to provide a separate enable signal to the controller module 40 (or the output cam module 52). The ability to control the latch/unlatch operations based on parameters other than input motor position is advantageous because it provides flexibility.

Further, the ability to control latch/unlatch operations based on the state of an associated enable bit also provides the user with the ability to define dependencies between cam elements. Thus, the operator is provided with the ability to condition the latch or unlatch operation of one cam element to the current output state of another cam element assigned to another output bit. The source of an enable bit can be assigned to an output bit associated with another cam element. This allows the user to condition the latch or unlatch operation of one cam element to the current output state of another cam element assigned to another output bit.

Another possible event state that a user may use to control latch/unlatch operations is an event state determined by an application task. Thus, the user may specify only the latch or unlatch operation of a cam, and allocate the opposing operation to an application task by setting the latch or unlatch type to inactive. For example, in a bottle filling operation, it may be desirable for the filling operation to start with the presence of a bottle when the machine is at a particular position, and end when an application task determines that the bottle is full. The user is permitted to specify a turn on (latch) operation of type "position and enable" to actuate the filling process, and a turn off (unlatch) operation of "inactive" allowing the user application to stop the filling process by turning the output bit off. Additional behaviors can be combined such as latching or unlatching based on position and the state of an enable bit, and unlatching based on time duration and the state of an enable bit.

Second, the user is provided with the ability to use multiple cam element assignments. No limitations are imposed (other than available memory and performance) to the number of cam elements that can be assigned to each output bit. Therefore, each output bit may be controlled as a function of multiple cam elements.

Third, the user has the ability to specify separate latch and unlatch operations per cam element. For example, the user can specify the turn on (latch) behavior as position and enable, and the turn off (unlatch) behavior as duration.

Finally, the user has the ability to dynamically change cam element (latch, unlatch) behavior during operation of the motion control system 10. The output cam instructions 110 and 150 are preferably executed in a multi-tasking environment which allows the controller module 40 to examine the configuration data at each update cycle and implements changes dynamically. The user may be permitted to change these values either programmatically or through an online data monitor. Thus, it is possible to change cam element definitions independent of the arm output cam instruction 110, for example, using other instructions in the programming interface, in response to user inputs using the on-line data monitor, and so on. It is possible to do this while the motion control axis is moving and without reinitiating the arm output cam instruction. The user is permitted to change the value (e.g., the duration time, the left and right position, and so on) or the type (e.g., from duration to position and enable). This is valuable during system setup or when the motion control system 10 switches from one operation to another (e.g., switches from handling one product to another). This allows the user to keep the machine running when doing the changeover, which increases productivity. The controller module 40 is a multi-tasking system, and the controller module 40 examines the configuration data at each update cycle and implements changes dynamically.

b. Output Compensation Operand

By way of overview, the output compensation operand 128 allows offset, delay, and mode compensations to be defined and implemented for each output bit. The parameters specified by the output compensation operand 128 include an offset parameter, a latch delay parameter, an unlatch delay parameter, a mode parameter, a pulse cycle time parameter, and a pulse duty cycle parameter.

Figure 15:
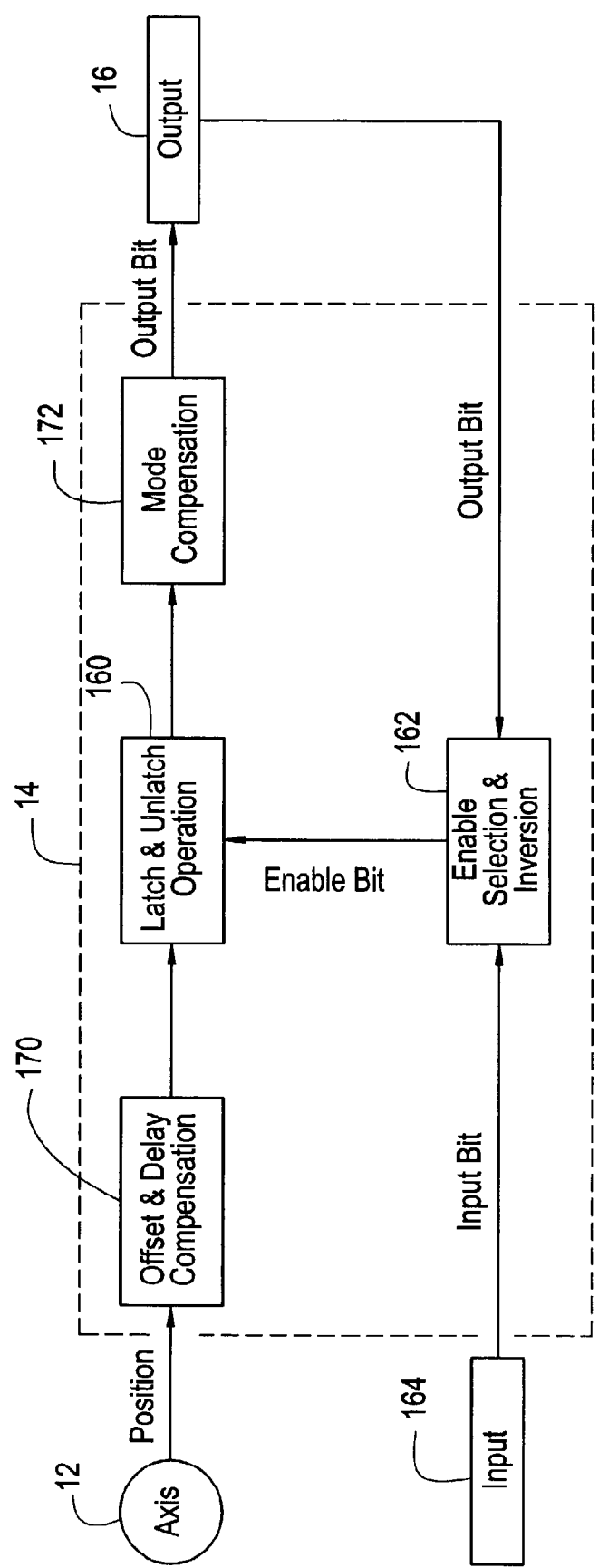
FIG. 15 shows the effect of output compensation on the relationships between the axis, input, and output.

FIG. 15 is a block diagram showing the operation of the output cam block 14 that takes into account the features provided by the output compensation operand. FIG. 15 is the same as FIG. 11, except that it also shows an offset and delay compensation block 170 and a mode compensation block 172, both of which are associated with the output compensation operand 128.

With regard to the offset and delay compensation block 170, and as described in greater detail below, each output bit can have associated with it a position offset, a turn on (latch) time delay and a turn off (unlatch) time delay. The position offset allows the user to advance or retard all cam elements assigned to the output. Latch and unlatch time delays permit the user to enter time delays to turn on/off an output bit sooner or later and thereby to take into account the fact that different output devices may take different amounts of time to latch or unlatch. Again, it is possible to adjust these parameters independent of the arm output cam instruction 110, for example, using other instructions in the programming interface, in response to user inputs using the on-line data monitor, and so on, while the motion control axis is moving and without reinitiating the arm output cam instruction 110.

With regard to the mode compensation block 172, and as also described in greater detail below, each output bit can have associated with it a mode compensation. As will be described below, depending on the mode compensation that is selected, latching and unlatching an output bit is not necessarily the same as turning on and off the associated output device 50. For example mode compensation may be implemented so as to cause an output bit to pulse in the latched state rather than remain on. Again, it is possible to adjust these parameters independent of the arm output cam instruction 110, for example, using other instructions in the programming interface, in response to user inputs using the on-line data monitor, and so on, while the motion control axis is moving and without reinitiating the arm output cam instruction 110.

In one embodiment, the blocks 160, 162, 170 and 172 are implemented using control logic that includes one or more tables that store the information specified above as a separate entry for each cam element. For purposes of explanation, it is assumed that four tables are used, although it may be noted that in practice the tables may be combined, such as by combining the tables for blocks 160 and 162, and by combining the tables for the blocks 170 and 172.

As the motion control axis of the axis block 12 moves, the position of the axis is monitored and this information is provided to block 170. For each output bit, the table implemented in block 170 is accessed to provide offset and delay compensation as described above. A compensated latch and unlatch position for each output bit is maintained. Preferably, delta position information for the motion control axis is employed, and a cam position is defined which moves within the cam range at the same rate at which the axis position moves with the axis range of movement. The information from the block 170 is provided to the latch and unlatch block 160, and latch and unlatch operations are performed. The latched/unlatched state of each cam element is provided to the mode compensation block 172, which determines how the output device should be controlled based on the latched/unlatched state of the cam element (e.g., normal, inverted, pulsed, and inverted and pulsed, as described below).

(i) Offset and Delay Compensation

Figure 16:
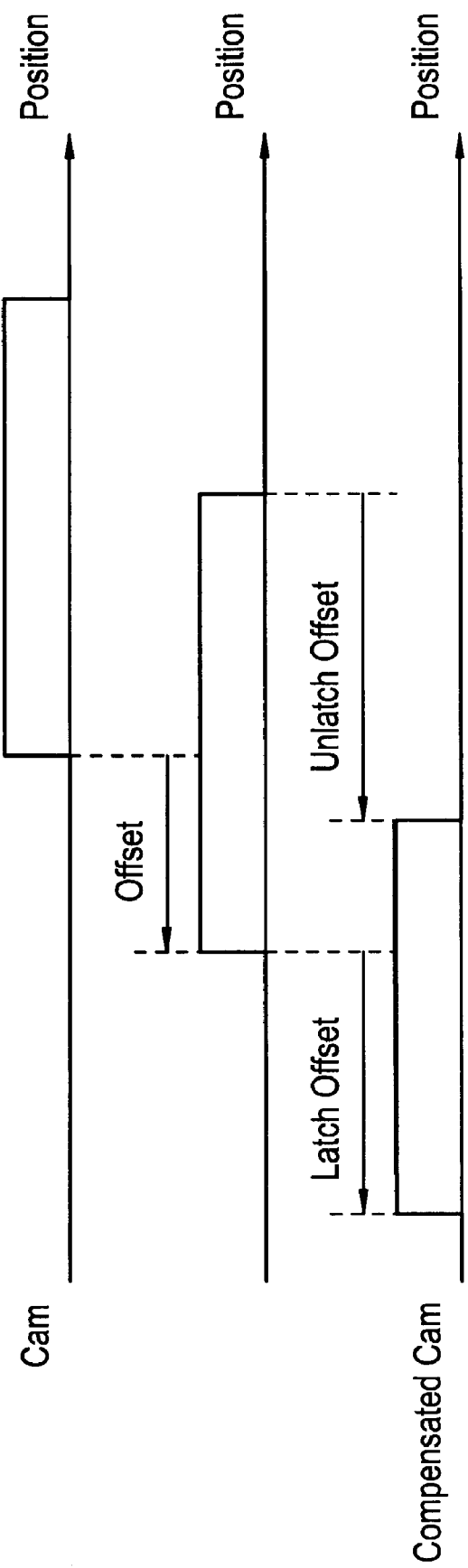
FIG. 16 shows the effect of compensation values on an output cam element.

FIG. 16 shows the effect of the compensation values on an output cam element. As shown therein, the cam is defined by the left and right cam positions of the output cam element. The compensated cam is defined by the position offset and latch and unlatch offsets.

The offset parameter provides position compensation and may be specified in position units (e.g., user units). The position offset allows the user to advance or retard all cam elements assigned to the output. The latch and unlatch delay parameter compensate for different latch/unlatch times of different types of output devices 50. Latch and unlatch time delays may be entered as a float value in units of seconds. The latch and unlatch compensation provides speed and acceleration compensation for the latch and separately for the unlatch operation. The user is permitted to specify latch and unlatch time delays for particular output devices 50. The position compensation is then calculated based on current velocity and acceleration as follows:

$$\text{Latch Offset} = v * \text{Latch Delay} + a * \frac{\text{Latch Delay}^2}{2}$$

$$\frac{\text{Unlatch}}{\text{Offset}} = v * \text{Unlatch Delay} + a * \frac{\text{Unlatch Delay}^2}{2}$$

where v is the current axis speed and a is the axis acceleration, and LatchDelay and UnlatchDelay are values specified by the user for a particular output device 50. The acceleration value a is continuously updated (i.e., every update cycle). Preferably, the acceleration value is filtered so as to obtain a smooth acceleration value which avoids jitter. It is also possible to obtain the internal calculation of the acceleration and velocity command from the servo drive 42 and use this value in the above equations. It may also be noted that it is possible for the user to specify either a positive or negative position offset or a negative position offset, as well as a positive delay or a negative delay.

The following equation illustrates the effect of the compensation values on the duration of an output cam element.

Compensated Duration=Duration+Latch Delay−Unlatch Delay

From the foregoing, a number of additional features should be apparent. First, the latch compensation for a given output device 50 is separately configurable from the unlatch compensation for that output device 50 such that compensation may be performed independently. Thus, the operator has the ability to specify a turn-on compensation that accurately reflects the turn-on delay of an output device 50 as well as a separate turn-off compensation that accurately reflects the turn-off delay of the output device 50. Also, it is possible to configure different latch and unlatch compensations for different output devices 50. Thus, the operator is provided with the ability to specify different turn-on compensations for different output devices 50 and/or the ability to specify different turn-off compensations for different output devices 50. Thus, it is possible to specify a latch delay and different unlatch delay for a given output device 50, and also to specify different latch/unlatch delays for different output devices 50.

Second, it may also be noted that the compensations may be dynamically adjusted based on system conditions. For example, if an actuator begins to wear causing an increase in the time required to turn it on, then the user has the ability to dynamically change the position offset, latch delay and unlatch delay for each output device 50 either programmatically or through an online data monitor. This is advantageous because shutting down the equipment to re-adjust, change the position of the output device, or enter a new compensation delay value would require stopping and restarting the process resulting in product waste. Another advantage is the ability to affect all cam elements defined for a particular output bit at the same time by making a change in one place, namely, the position offset parameter. Every cam element that is assigned to the output bit is offset by the same amount because each cam element uses the same position offset value.

Third, the system has the ability to adjust compensation based on velocity and acceleration. During normal startup and shutdown procedures, the customers packaging equipment will experience periods of acceleration and deceleration while product is being processed. Camming functions will occur during this time and the accuracy of the output is as important during accel/decel as it is during constant velocity. Thus, the ability to adjust for both velocity and acceleration improves system operation, for example, during normal startup and shutdown procedures.

Fourth, the compensation may be time-based or delta position-based. Specifying the delay in terms of time (as in the case of the latch/unlatch delays) is advantageous, because then the compensation is independent of speed/acceleration. Output devices take a certain amount of time to actuate, and the actuation time is the same regardless of the speed of the axis. Therefore, specifying delay in terms of time is easier because the speed of axis does not need to be taken into account.

(ii) Mode Compensation

Figure 17:
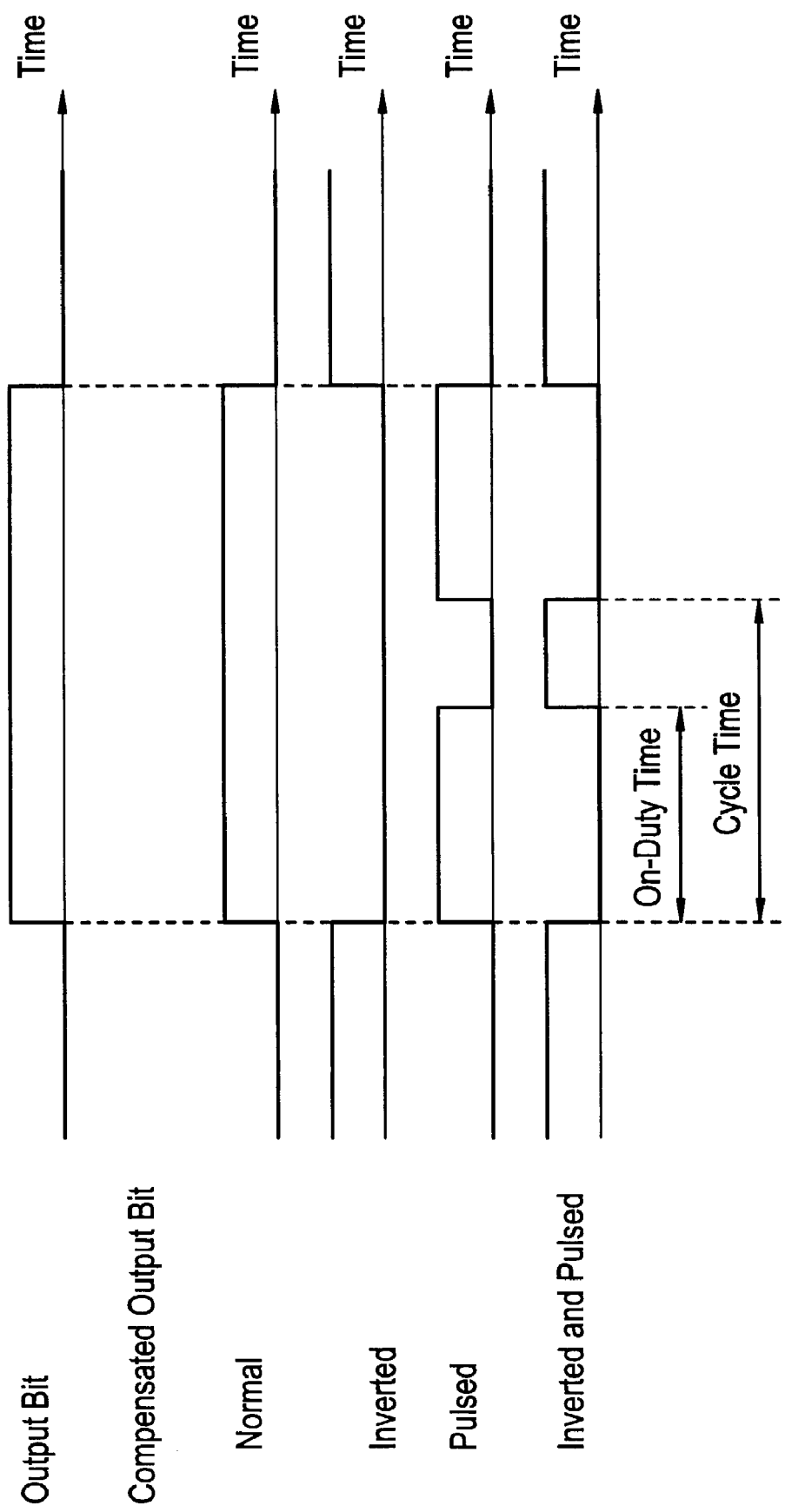
FIG. 17 shows the effect of the mode, cycle time, and duty cycle on an output bit.

Mode compensation allows the output devices 50 to be controlled so as to behave in different ways depending on which mode of operation is selected. The output bit can have one of the following output modes: normal, inverted, pulsed, and inverted and pulsed. FIG. 17 shows the effect of the mode, cycle time, and duty cycle on an output bit. In the normal mode, the output bit is set, when the output of the latch and unlatch operation becomes active, and is reset when the output of the latch and unlatch operation becomes inactive. In the inverted mode of operation, the output bit is set when the output of the latch and unlatch operation becomes inactive, and is reset when the output of the latch and unlatch operation becomes active. In the pulsed mode of operation, the output bit is pulsed when the output of the latch and unlatch operation is active, and is reset when the output of the latch and unlatch operation becomes inactive. The on-duty state of the pulse corresponds to the active state of the output bit. In the inverted and pulsed mode of operation, the output bit is pulsed when the output of the latch and unlatch operation is active, and is set when the output of the latch and unlatch operation becomes inactive. The on-duty state of the pulse corresponds to the inactive state of the output bit. If the pulsing mode of operation is selected then the cycle time and duty cycle parameters mentioned above are also used. Preferably, the user has the ability to dynamically change the mode, cycle time, and duty cycle settings. All cam elements associated with the output will behave the same way.

The pulsing is preferably time-based so as not to be affected by axis speed. In this arrangement, the pulse cycle time is specified as a floating point value in seconds, and the duty cycle is specified as a percent of on-time to off-time. The ability to pulse the output is advantageous in situations where it is necessary to perform an operation based on a time-based pulsing pattern (e.g., a stitching process that applies glue to produce a pattern of glue spots). The pulsing feature could also be used to simulate an analog output.

(iii) Position and Compensation Monitoring

As previously indicated, for each output bit of the output block 16, a current latch and unlatch position is maintained.

This allows the current latch and unlatch position to be compensated independently. Additionally, as previously mentioned, the user has the ability to assign multiple output cams to each output device 50. The above-described compensation applies for all the cams that are defined for a given output device 50. As described above in connection with FIG. 15, a cam table is used to track the compensated latch and unlatch positions of the output bits of the output block 16 as compared to the position of the motion control axis. Every time updated position information is obtained, the cam table is scanned to determine which if any output states need to be changed. The cam table is scanned every update cycle and the compensated position is applied against the cam table, allowing the changes to be made dynamically.

Further, it is desirable to be able to maintain two different cam tables at the same time for each output bit, at least in some instances. As previously noted, it is possible to start a cam, execute the cam using one cam profile, and then change the cam profile, and begin execution of the new cam profile with an execution schedule of pending. Because of the position compensation described above, there is not a "clean" break between the two cam profiles. Different cams have different compensated positions, even if the uncompensated position is the same. Essentially, this means that two cam profiles may be operating simultaneously. Thus, a latch position may be using one cam table and one compensation table, and an unlatch position is using a different cam table and a different compensation table. An output bit may either be in the context of the active cam, and its cam definition and its cam compensation and parameters, or in the context of the pending cam and its cam definition and its compensation table. Therefore, the use of multiple compensation tables permits position to be tracked in different contexts, so that two cams may be supported while the cams are transitioning, and one cam (or output bit) is in one context and the other cam (or output bit) is in the other context. As an alternative example, the latch position of one output bit could be in the new context while the unlatch position of that output bit is still in the old context while the unlatch operation is finishing. One output bit may be in two different contexts or two different cams (and two different cam profiles) at the same time. Once all of the cam profiles have transitioned, the pending cam becomes the active cam and the prior active cam terminates, and then only one cam remains.

3. Overlapping Cams

Figure 18:
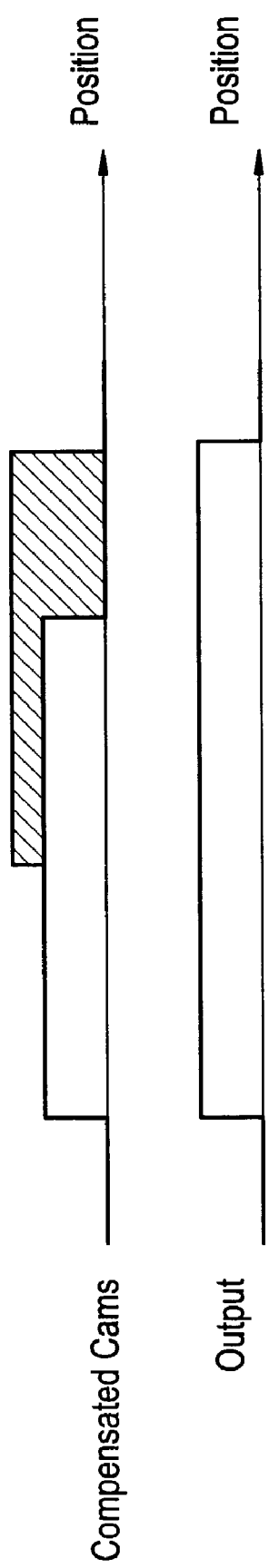
FIG. 18 shows operation of overlapping cam elements being combined to produce an extended output cam.

Referring now to FIG. 18, FIG. 18 shows how two overlapping cam elements for an output may be handled. The overlapping cam elements may be combined producing one extended output cam. Multiple cams may therefore be specified for an output bit and, if the cams are overlapping, no discontinuities are observed. As previously indicated, no limitations are imposed, other than available memory and performance, to the number of cam elements that can be assigned to each output bit.

4. Output Cam Editor

Figure 19:
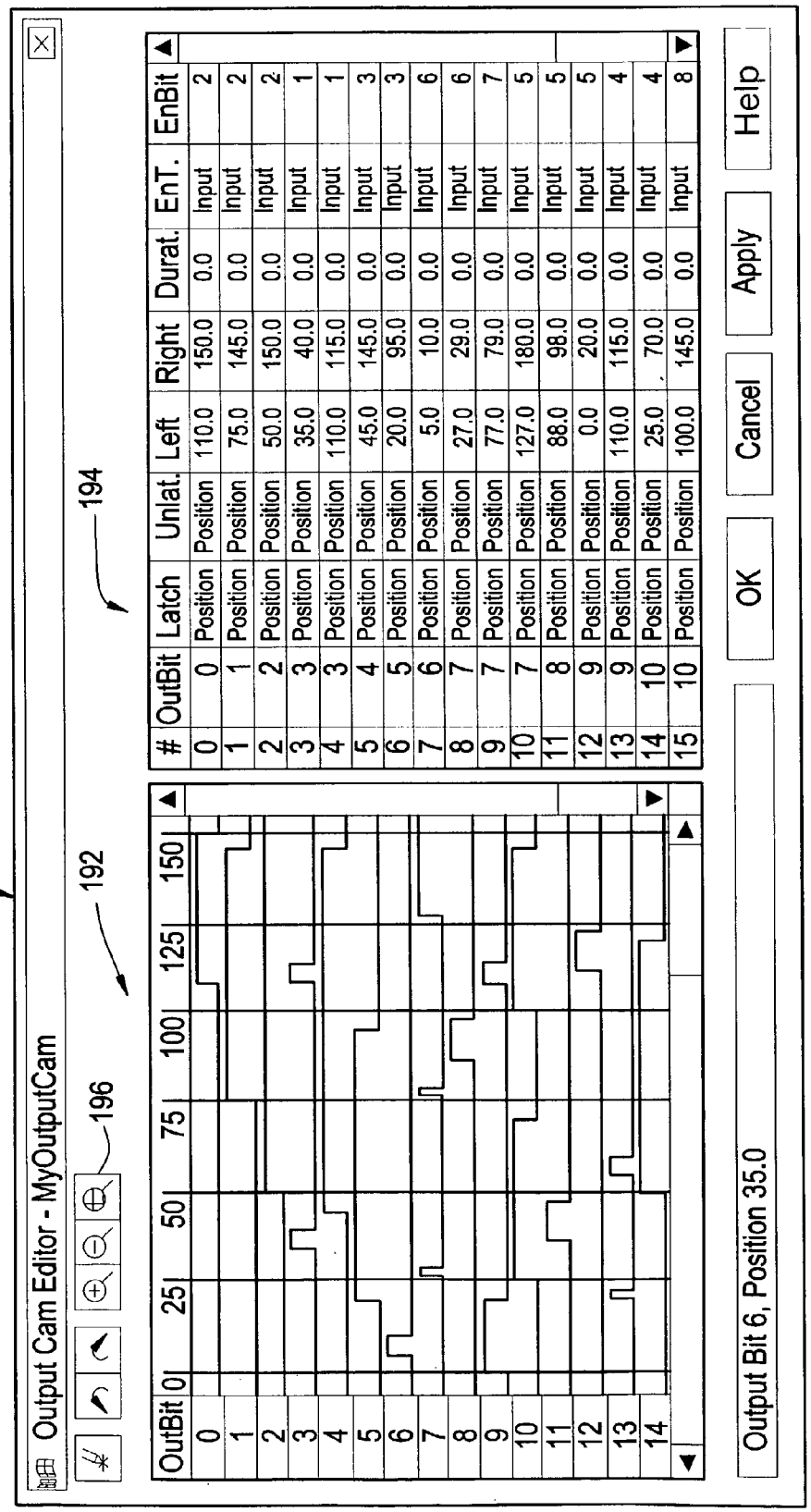
FIG. 19 is a user interface of a graphical output cam editor.

In the preferred embodiment, an output cam editor such as the output cam editor 190 shown in FIG. 19 is provided. The output cam editor 190 provides an easy to use graphical user interface to edit and view output cam arrays associated with the output cam operand 122. The output cam editor 190 comprises two different display regions or views 192, 194 and a toolbar 196. Each view 192, 194 is a different representation of the same output cam array. The graph view 192 displays the output cam profiles as line graphs ordered by output bit. The graph view 192 depicts rising and falling edges corresponding to the latch and unlatch operations of individual cam elements as a function of position (or, alternatively, time). The graph view 192 is also usable (e.g., using a mouse or keyboard to receive user inputs) to permit a user to redefine each of the cam profiles by manipulating rising and falling edges in the cam profiles shown of the graphical representation.

The grid or tabular view 194 is a direct representation of the array data. The tabular view 194 provides a tabular representation of the cam profiles for the output bits, and comprises numeric and non-numeric values describing the latch and unlatch operations of the cam elements. The toolbar 196 provides access to the Insert, Undo, Redo, Zoom-In, Zoom-Out, and Zoom-To-Fit command buttons. The output cam editor 190 therefore presents output cam configuration data in both a tabular and graphical form, providing an easier way to view and modify cam elements for each output bit.

The techniques described herein extend to those embodiments which, fall within the scope of the appended claims, regardless of whether they provide any of the above-mentioned advantageous features.

Many changes and modifications may also be made to the invention without departing from the spirit thereof. The scope of these changes will become apparent from the appended claims.

What is claimed is:

1. A control method implemented by a microprocessor-based control system, comprising:
   monitoring a position of a motion control axis;
   controlling an output device responsive to the position of the motion control axis, including
      latching an electronic cam element that controls the output device, the cam element being implemented in a memory of the microprocessor-based control system, and
      unlatching the cam element that controls the output device;
   wherein a manner in which the latching step is performed and a manner in which the unlatching step is performed are configurable in a programming interface of the microprocessor-based control system;
   wherein the programming interface is capable of receiving a latch position for the cam element and an unlatch position for the cam element;
   wherein the programming interface is further capable of receiving additional configuration information to configure the manner in which the latching step is performed and different additional configuration information to separately configure the manner in which the unlatching step is performed;
   wherein the latching step and the unlatching step are performed in the manner configured in the programming interface; and
   wherein the additional configuration information specifies latch compensation for the latching step and the different additional configuration information specifies different unlatch compensation for the unlatching step.

2. A method according to claim 1, wherein the programming interface is capable of adjusting the additional configuration information and the different additional configuration information, and initiating performance of the latching and unlatching steps in accordance with the adjusted additional configuration information and the different additional configuration information, during movement of the motion control axis.

3. A method according to claim 1, wherein the programming interface receives the latch position and the unlatch position; and wherein the output device is latched at the latch position and unlatched at the unlatch position.

4. A method according to claim 1, wherein the controlling step further comprises
latching the cam element when the motion control axis is at a first position,
determining that the position of the motion axis has changed by a predetermined amount, the predetermined amount being equal to a delta position value specified in a parameter of a user program, and
unlatching the cam element in response to the determining step, the cam element device being unlatched when the motion control axis is at a second position that is approximately equal to the first position plus the delta position value.

5. A method according to claim 1, wherein the controlling step further comprises (1) repeatedly changing the state of a cam element that controls the output device from a first state to a second state in response to a first condition being met, the first condition being specified as a parameter of an output cam instruction of a user program, and (2) repeatedly changing the state of the cam element from the second state to the first state in response to a second condition being met;
wherein the changing step (1) is performed during execution of the output cam instruction, and the changing step (2) is performed during execution of an instruction other than the output cam instruction.

6. A method according to claim 5, wherein the controlling step is performed using an output cam instruction, and wherein the changing step (2) is performed without reinitiating the output cam instruction.

7. A method according to claim 1, wherein the additional configuration information includes a parameter that configures an output behavior of the output device as pulsed.

8. A method according to claim 7, wherein the output cam instruction includes a parameter that permits a pulse cycle time of the output behavior to be configured.

9. A method according to claim 8, wherein the output cam instruction includes a parameter that permits a pulse duty cycle of the output behavior to be configured.

10. A method according to claim 1, wherein the output device has only two output states including an on state and an off state, wherein controlling the output device comprises causing the output device to alternate between the on state and the off state, and wherein whether the output device is in the on state or the off state is determined at least in part by whether the cam element is latched or unlatched.

11. A method according to claim 10, wherein the latching is performed in response to determining that the motion control axis is at a predetermined position.

12. A control method implemented by a microprocessor-based control system, comprising:
monitoring a position of a motion control axis;
controlling an output device responsive to the position of the motion control axis, including
latching an electronic cam element that controls the output device, the cam element being implemented in a memory of the microprocessor-based control system, and
unlatching the cam element that controls the output device;
wherein a manner in which the latching step is performed and a manner in which the unlatching step is performed are configurable in a programming interface of the microprocessor-based control system;
wherein the programming interface is capable of receiving a latch position for the cam element and an unlatch position for the cam element;
wherein the programming interface is further capable of receiving additional configuration information to configure the manner in which the latching step is performed and different additional configuration information to separately configure the manner in which the unlatching step is performed;
wherein the latching step and the unlatching step are performed in the manner configured in the programming interface; and
wherein the additional configuration information specifies a latch condition for the latching step and the different additional configuration information specifies a different unlatch condition for the unlatching step.

13. A method according to claim 12, wherein the latch condition is one of inactive, position, enable, and position and enable, and the unlatch condition is a different one of inactive, position, duration, enable, position and enable, and duration and enable.

14. A control method implemented by a microprocessor-based control system, comprising:
monitoring a position of a motion control axis;
controlling an output device responsive to the position of the motion control axis, including
latching an electronic cam element that controls the output device, the cam element being implemented in a memory of the microprocessor-based control system, and
unlatching the cam element that controls the output device;
wherein a maimer in which the latching step is performed and a maimer in which the unlatching step is performed are configurable in a programming interface of the microprocessor-based control system;
wherein the programming interface is capable of receiving a latch position for the cam element and an unlatch position for the cam element;
wherein the programming interface is further capable of receiving additional configuration information to configure the maimer in which the latching step is performed and different additional configuration information to separately configure the maimer in which the unlatching step is performed;
wherein the latching step and the unlatching step are performed in the manner configured in the programming interface; and
wherein the additional configuration and the different additional configuration information are received as user-configurable parameters of an output cam instruction, and wherein the programming interface is capable of adjusting the additional configuration information and the different additional configuration information, and initiating performance of the latching and unlatching steps in accordance with the adjusted additional configuration information and the different additional configuration information, without reinitiating the output cam instruction.

15. A control method implemented by a microprocessor-based control system, comprising:
monitoring a position of a motion control axis:
controlling an output device responsive to the position of the motion control axis, including latching an electronic cam element that controls the output device, the cam element being implemented in a memory of the microprocessor-based control system, and unlatching the cam element that controls the output device;

wherein a manner in which the latching step is performed and a manner in which the unlatching step is performed are configurable in a programming interface of the microprocessor-based control system;

wherein the programming interface is capable of receiving a latch position for the cam element and an unlatch position for the cam element;

wherein the programming interface is further capable of receiving additional configuration information to configure the manner in which the latching step is performed and different additional configuration information to separately configure the manner in which the unlatching step is performed;

wherein the latching step and the unlatching step are performed in the manner configured in the programming interface;

wherein the output device is one of a plurality of output devices;

wherein the method further comprises controlling the plurality of output devices responsive to the position of the motion control axis, including implementing a latch compensation and an unlatch compensation for each respective one of the output devices; and wherein the latch compensation and the unlatch compensation are separately configurable for each respective one of the output devices thereby permitting the latch compensation and the unlatch compensation for each respective one of the output devices to be different than the latch compensation and the unlatch compensation for each of the remaining ones of the plurality of output devices.

16. A method according to claim 15, wherein at least one of the latch compensation and the unlatch compensation for at least one of the plurality of output devices is determined as a function of a velocity and an acceleration of the motion control axis.

17. A control method implemented by a microprocessor-based control system, comprising:

monitoring a position of a motion control axis;

controlling a plurality of output devices responsive to the position of the motion control axis, including latching electronic cam elements that control the output devices, the cam elements being implemented in a memory of the microprocessor-based control system, and unlatching the cam elements that control the output devices;

wherein a manner in which the latching step is performed and a manner in which the unlatching step is performed are configurable in a programming interface of the microprocessor-based control system;

wherein the programming interface is capable of receiving a latch position for each of the cam elements;

wherein the programming interface is further capable of receiving additional configuration information to separately configure the manner in which the latching step is performed for each of the different cam elements;

wherein the additional configuration information specifies latch compensation for the latching step and the different additional configuration information specifies different unlatch compensation for the unlatching step; and wherein the latching step and the unlatching step are performed in the manner configured in the programming interface.

18. A method according to claim 17, wherein the output devices each have only two output states including an on state and an off state, wherein controlling each of the output devices comprises causing the output device to alternate between the on state and the off state, and wherein whether the output device is in the on state or the off state is determined at least in part by whether the cam element is latched or unlatched.

19. A method according to claim 18, wherein the latching is performed in response to determining that the motion control axis is at a predetermined position.

20. A control method implemented in a microprocessor-based control system, comprising:

monitoring a position of a motion control axis;

controlling an output device responsive to the position of the motion control axis, including implementing a latch delay compensation, the latch delay compensation compensating for an amount of time required for the output device to turn on after a control signal provided to the output device changes state;

implementing an unlatch delay compensation, the unlatch delay compensation compensating for an amount of time required for the output device to turn off after the control signal provided to the output device changes state;

wherein the latch delay compensation and the unlatch delay compensation are separately configurable to permit an amount of delay provided by the latch delay compensation to be different than an amount of delay provided by the unlatch delay compensation; and wherein the latch delay compensation and the unlatch delay compensation are received as configuration information from a programming interface for the microprocessor-based control system, wherein controlling the output device comprises latching an electronic cam element that controls the output device and unlatching the cam element that controls the output device, wherein the latch delay compensation is used in connection with the latching of the cam element and the unlatch delay compensation is used in connection with the unlatching of the cam element, and wherein the cam element is implemented in a memory of the microprocessor-based control system.

21. A method according to claim 20, wherein the output device has only two output states including an on state and an off state, wherein controlling the output device comprises causing the output device to alternate between the on state and the off state, and wherein whether the output device is in the on state or the off state is determined at least in part by whether the cam element is latched or unlatched.

22. A method according to claim 21, wherein the latching is performed in response to determining that the motion control axis is at a predetermined position.

* * * * *